(12) United States Patent
Takagishi et al.

(10) Patent No.: US 11,398,244 B2
(45) Date of Patent: Jul. 26, 2022

(54) MAGNETIC HEAD WITH STACKED BODY HAVING NON-MAGNETIC LAYERS AND DIFFERING LENGTH MAGNETIC LAYERS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masayuki Takagishi, Kunitachi (JP); Naoyuki Narita, Funabashi (JP); Tomoyuki Maeda, Kawasaki (JP); Tazumi Nagasawa, Yokohama (JP); Hitoshi Iwasaki, Nerima (JP); Hirofumi Suto, Ota (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/177,331

(22) Filed: Feb. 17, 2021

(65) Prior Publication Data
US 2022/0005497 A1    Jan. 6, 2022

(30) Foreign Application Priority Data
Jul. 1, 2020    (JP) .................................. 2020-113972

(51) Int. Cl.
*G11B 5/235*    (2006.01)
*G11B 5/31*    (2006.01)
(Continued)

(52) U.S. Cl.
CPC .......... *G11B 5/3146* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS 8,345,380 B2    1/2013  Sato et al.
9,001,465 B1 *  4/2015  Shimizu et al. ..... G11B 5/3146
                                                      360/125.3
(Continued)

FOREIGN PATENT DOCUMENTS

JP    2008-277586 A    11/2008
JP    2008-305486 A    12/2008
(Continued)

OTHER PUBLICATIONS

Matsubara et al., "Experimental feasibility of spin-torque oscillator with synthetic field generation layer for microwave assisted magnetic recording", Journal of Applied Physics 109, 07B741, 2011, 4 pages.

*Primary Examiner* — Craig A. Renner
(74) *Attorney, Agent, or Firm* — Oblon, McClelland, Maier & Neustadt, L.L.P.

(57) ABSTRACT

According to one embodiment, a magnetic head includes first and second magnetic poles, and a stacked body provided between the first and second magnetic poles. The stacked body includes a first magnetic layer, a second magnetic layer provided between the first magnetic layer and the second magnetic pole, a third magnetic layer provided between the second magnetic layer and the second magnetic pole, a first nonmagnetic layer provided between the first and second magnetic layers, a second nonmagnetic layer provided between the second and third magnetic layers, and a third nonmagnetic layer provided between the first magnetic pole and the first magnetic layer. A first magnetic pole length of the first magnetic pole is less than a second magnetic pole length of the second magnetic pole.

(Continued)

A first magnetic layer length of the first magnetic layer is greater than a second magnetic layer length of the second magnetic layer.

12 Claims, 18 Drawing Sheets

(51) Int. Cl.
    *G11B 5/127*     (2006.01)
    *G11B 5/00*     (2006.01)

(52) U.S. Cl.
    CPC .............. *G11B 5/313* (2013.01); *G11B 5/314* (2013.01); *G11B 2005/0024* (2013.01)

(56) References Cited

U.S. PATENT DOCUMENTS

| | | | |
|---|---|---|---|
| 10,121,497 B1* | 11/2018 | Takahashi et al. | G11B 5/3146 |
| 2008/0019040 A1 | 1/2008 | Zhu et al. | |
| 2008/0268291 A1 | 10/2008 | Akiyama et al. | |
| 2008/0304176 A1 | 12/2008 | Takagishi et al. | |
| 2011/0205655 A1* | 8/2011 | Shimizu et al. | G11B 5/314 360/39 |
| 2012/0176702 A1 | 7/2012 | Yamada et al. | |
| 2012/0243127 A1* | 9/2012 | Iwasaki et al. | G11B 5/1278 360/110 |
| 2012/0262821 A1* | 10/2012 | Taguchi et al. | G11B 5/235 360/119.02 |
| 2012/0275061 A1* | 11/2012 | Takagishi et al. | G11B 5/3146 360/125.03 |
| 2014/0211340 A1* | 7/2014 | Sugiura et al. | G11B 5/3133 360/97.11 |
| 2016/0314809 A1* | 10/2016 | Taguchi et al. | G11B 5/314 |
| 2017/0186450 A1* | 6/2017 | Yamada et al. | G11B 5/3146 |
| 2017/0236537 A1* | 8/2017 | Murakami et al. | G11B 5/1278 360/125.3 |
| 2018/0261241 A1* | 9/2018 | Narita et al. | G11B 5/315 |
| 2020/0294535 A1* | 9/2020 | Narita et al. | G11B 5/314 |
| 2021/0074319 A1 | 3/2021 | Takagishi et al. | |
| 2021/0074320 A1 | 3/2021 | Takagishi et al. | |

FOREIGN PATENT DOCUMENTS

| | | |
|---|---|---|
| JP | 2012-146351 A | 8/2012 |
| JP | 2021-44028 A | 3/2021 |
| JP | 2021-44029 A | 3/2021 |

\* cited by examiner

MAGNETIC HEAD WITH STACKED BODY HAVING NON-MAGNETIC LAYERS AND DIFFERING LENGTH MAGNETIC LAYERS

CROSS-REFERENCE TO RELATED APPLICATIONS

This application is based upon and claims the benefit of priority from Japanese Patent Application No. 2020-113972, filed on Jul. 1, 2020; the entire contents of which are incorporated herein by reference.

FIELD

Embodiments described herein generally relate to a magnetic head and a magnetic recording device.

BACKGROUND

Information is recorded in a magnetic recording medium such as a HDD (Hard Disk Drive) or the like by using a magnetic head. It is desirable to increase the recording density of the magnetic head and the magnetic recording device.

DETAILED DESCRIPTION

Figures 1A, 1B:
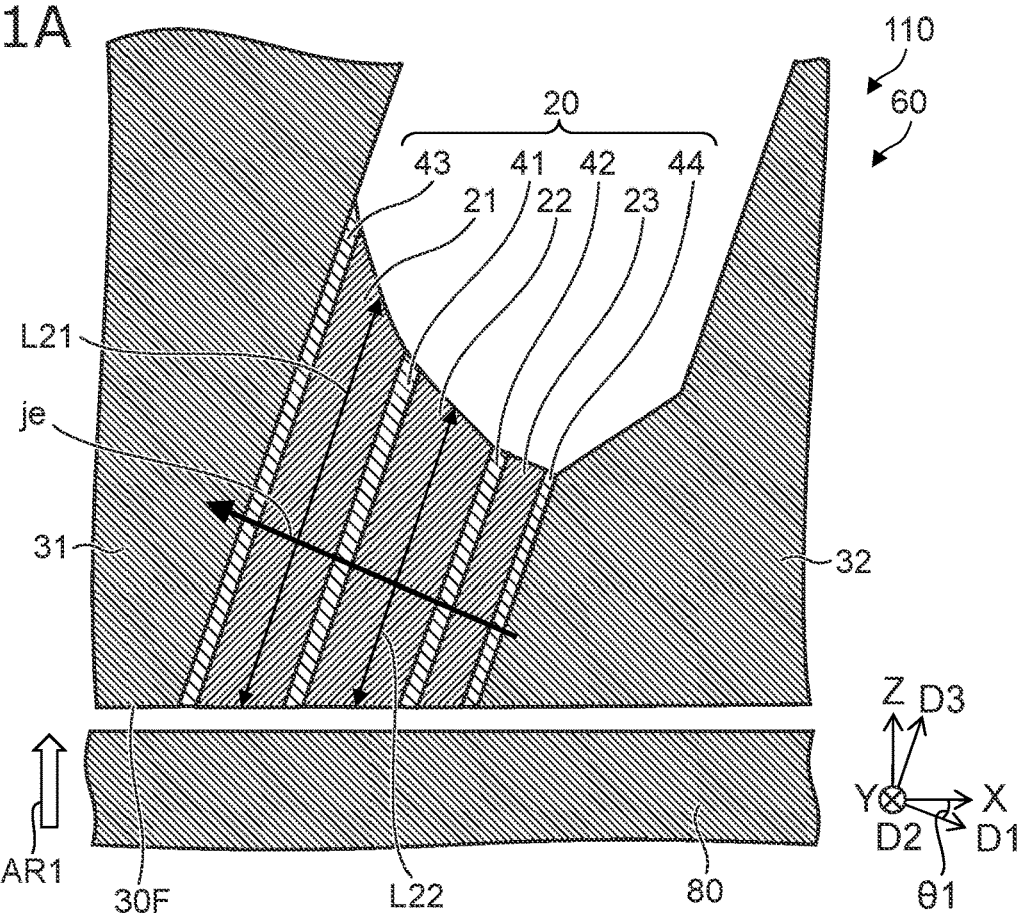
FIGS. 1A and 1B are schematic views illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic layer and the second magnetic pole, a third magnetic layer provided between the second magnetic layer and the second magnetic pole, a first nonmagnetic layer provided between the first magnetic layer and the second magnetic layer, a second nonmagnetic layer provided between the second magnetic layer and the third magnetic layer, and a third nonmagnetic layer provided between the first magnetic pole and the first magnetic layer. A first magnetic pole length of the first magnetic pole along a second direction is less than a second magnetic pole length of the second magnetic pole along the second direction. The second direction is along a medium-facing surface of the first magnetic pole and is perpendicular to a first direction from the first magnetic layer toward the second magnetic layer. A first magnetic layer length of the first magnetic layer along a third direction perpendicular to the first direction is greater than a second magnetic layer length of the second magnetic layer along the third direction.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the second magnetic layer and the first magnetic layer, a second nonmagnetic layer provided between the third magnetic layer and the second magnetic layer, and a third nonmagnetic layer provided between the first magnetic layer and the second magnetic pole. A first magnetic pole length of the first magnetic pole along a second direction is less than a second magnetic pole length of the second magnetic pole along the second direction. The second direction is along a medium-facing surface of the first magnetic pole and is perpendicular to a first direction from the second magnetic layer toward the first magnetic layer. A second magnetic layer length of the second magnetic layer along a third direction perpendicular to the first direction is greater than a first magnetic layer length of the first magnetic layer along the third direction.

According to one embodiment, a magnetic recording device includes any one of the magnetic heads described above; and an electrical circuit. The electrical circuit is configured to supply a current to the stacked body. The current has an orientation from the first magnetic layer toward the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIGS. 1A and 1B are schematic views illustrating a magnetic head according to a first embodiment.

FIG. 1A is a cross-sectional view. FIG. 1B is a plan view as viewed along arrow AR1 of FIG. 1A.

Figure 2:
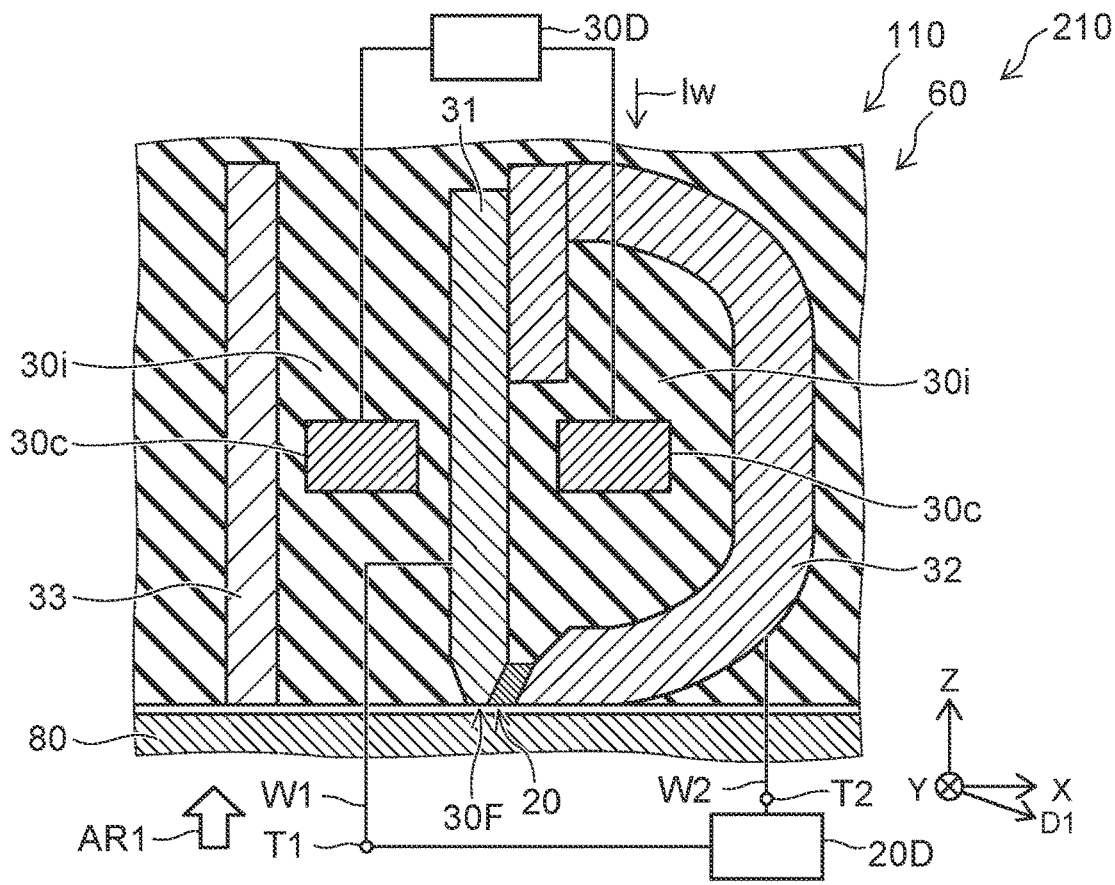
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, the magnetic recording device 210 according to the embodiment includes the magnetic head 110 and an electrical circuit 20D. The magnetic recording device 210 may include a magnetic recording medium 80. At least a recording operation is performed in the magnetic recording device 210. In the recording operation, information is recorded in the magnetic recording medium 80 by using the magnetic head 110.

The magnetic head 110 includes a recording part 60. As described below, the magnetic head 110 may include a reproducing part. The recording part 60 includes a first magnetic pole 31, a second magnetic pole 32, and a stacked body 20. The stacked body 20 is located between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield.

The direction from the magnetic recording medium 80 toward the magnetic head 110 is taken as a Z-axis direction. One direction perpendicular to the Z-axis direction is taken as an X-axis direction. A direction perpendicular to the Z-axis direction and the X-axis direction is taken as a Y-axis direction. For example, the Z-axis direction corresponds to the height direction. For example, the X-axis direction corresponds to the down-track direction. For example, the Y-axis direction corresponds to the cross-track direction. The magnetic recording medium 80 and the magnetic head 110 move relatively along the down-track direction. A magnetic field (a recording magnetic field) that is generated from the magnetic head 110 is applied to the desired position of the magnetic recording medium 80. The magnetization of the desired position of the magnetic recording medium 80 is controlled to be in a direction corresponding to the recording magnetic field. Thereby, the information is recorded in the magnetic recording medium 80.

The direction from the first magnetic pole 31 toward the second magnetic pole 32 is taken as a first direction D1. The first direction D1 is substantially along the X-axis direction. According to the embodiment, the first direction D1 may be tilted at a small angle with respect to the X-axis direction.

A coil 30c is provided as shown in FIG. 2. In the example, a portion of the coil 30c is between the first magnetic pole 31 and the second magnetic pole 32. A shield 33 is provided in the example. The first magnetic pole 31 is between the shield 33 and the second magnetic pole 32 in the X-axis direction. Another portion of the coil 30c is between the shield 33 and the first magnetic pole 31. An insulating portion 30i is provided between these multiple components. The shield 33 is, for example, a leading shield. The magnetic head 110 may include a side shield (not illustrated).

As shown in FIG. 2, a recording current Iw is supplied from a recording circuit 30D to the coil 30c. A recording magnetic field that corresponds to the recording current Iw is applied from the first magnetic pole 31 to the magnetic recording medium 80.

As shown in FIG. 2, the first magnetic pole 31 includes a medium-facing surface 30F. The medium-facing surface 30F is, for example, an ABS (Air Bearing Surface). For example, the medium-facing surface 30F faces the magnetic recording medium 80. For example, the medium-facing surface 30F is along the X-Y plane.

As shown in FIG. 2, the electrical circuit 20D is electrically connected to the stacked body 20. In the example, the stacked body 20 is electrically connected to the first and second magnetic poles 31 and 32. A first terminal T1 and a second terminal T2 are provided in the magnetic head 110. The first terminal T1 is electrically connected to the stacked body 20 via first wiring W1 and the first magnetic pole 31. The second terminal T2 is electrically connected to the stacked body 20 via second wiring W2 and the second magnetic pole 32. For example, a current (e.g., a direct current) is supplied from the electrical circuit 20D to the stacked body 20.

As shown in FIGS. 1A and 1B, the stacked body 20 includes a first magnetic layer 21, a second magnetic layer 22, a third magnetic layer 23, a first nonmagnetic layer 41, a second nonmagnetic layer 42, a third nonmagnetic layer 43, and a fourth nonmagnetic layer 44. The insulating portion 30i is not illustrated in FIGS. 1A and 1B.

The second magnetic layer 22 is located between the first magnetic layer 21 and the second magnetic pole 32. The third magnetic layer 23 is located between the second magnetic layer 22 and the second magnetic pole 32. The first nonmagnetic layer 41 is located between the first magnetic layer 21 and the second magnetic layer 22. The second nonmagnetic layer 42 is located between the second magnetic layer 22 and the third magnetic layer 23. The third nonmagnetic layer 43 is located between the first magnetic pole 31 and the first magnetic layer 21. The fourth nonmagnetic layer 44 is located between the third magnetic layer 23 and the second magnetic pole 32.

For example, the first nonmagnetic layer 41 may contact the first magnetic layer 21 and the second magnetic layer 22. For example, the second nonmagnetic layer 42 may contact the second magnetic layer 22 and the third magnetic layer 23. For example, the third nonmagnetic layer 43 may contact the first magnetic pole 31 and the first magnetic layer 21. For example, the fourth nonmagnetic layer 44 may contact the third magnetic layer 23 and the second magnetic pole 32.

In the example as shown in FIG. 1A, the first direction D1 from the first magnetic layer 21 toward the second magnetic layer 22 is oblique to the medium-facing surface 30F of the first magnetic pole 31. The first direction D1 corresponds to the stacking direction of the stacked body 20.

A direction that is along the medium-facing surface 30F of the first magnetic pole 31 and is perpendicular to the first direction D1 is taken as a second direction D2. The second direction D2 is, for example, the Y-axis direction (the cross-track direction).

As shown in FIG. 1B, the length of the first magnetic pole 31 along the second direction D2 is taken as a first magnetic pole length w1. The length of the second magnetic pole 32 along the second direction D2 is taken as a second magnetic pole length w2. These lengths may be widths. The first magnetic pole length w1 is less than the second magnetic pole length w2.

Practically, the length along the second direction D2 (the Y-axis direction) of the first magnetic pole 31 at the X-axis direction center position of the first magnetic pole 31 may be used as the first magnetic pole length w1. Practically, the length along the second direction D2 (the Y-axis direction) of the second magnetic pole 32 at the X-axis direction center position of the second magnetic pole 32 may be used as the second magnetic pole length w2.

Because the first magnetic pole length w1 is less than the second magnetic pole length w2, the magnetic field from the first magnetic pole 31 easily enters the second magnetic pole 32; and the second magnetic pole 32 easily functions as the trailing shield.

As shown in FIG. 1A, one direction perpendicular to the first direction D1 is taken as a third direction D3. In the example, the third direction D3 crosses the second direction D2. For example, the third direction D3 is perpendicular to the second direction D2. In the example, the third direction D3 is oblique to the medium-facing surface 30F because the first direction D1 is oblique to the medium-facing surface 30F.

The length of the first magnetic layer 21 along the third direction D3 is taken as a first magnetic layer length L21. The length of the second magnetic layer 22 along the third direction D3 is taken as a second magnetic layer length L22. The first magnetic layer length L21 is greater than the second magnetic layer length L22. As described below, due to such a length relationship, a stable oscillation is easily obtained in the stacked body 20.

As shown in FIG. 1B, a current ic is supplied to such a stacked body 20. For example, the current ic is supplied from the electrical circuit 20D described above. As shown in FIG. 1B, the current ic has an orientation from the first magnetic layer 21 toward the second magnetic layer 22. As shown in FIGS. 1A and 1B, an electron current je that accompanies the current ic has an orientation from the second magnetic layer 22 toward the first magnetic layer 21.

For example, the magnetization of the stacked body 20 oscillates due to the current ic that is not less than a threshold flowing through the stacked body 20. For example, the stacked body 20 functions as a STO (Spin-Torque Oscillator). Due to the oscillation, an alternating current magnetic field (e.g., a high frequency magnetic field) is generated from the stacked body 20. The alternating current magnetic field that is generated by the stacked body 20 is applied to the magnetic recording medium 80 and assists writing to the magnetic recording medium 80. For example, MAMR (Microwave Assisted Magnetic Recording) can be performed.

In the magnetic head 110, for example, the first magnetic layer 21 and the second magnetic layer 22 function as oscillation generation layers. The third magnetic layer 23 functions as a spin injection layer. The magnetization of the third magnetic layer 23 is not fixed in a designated direction. The orientation of the magnetization of the third magnetic layer 23 is changeable in the operation.

For example, spin torque that is reflected by the first magnetic pole 31 acts on the first magnetic layer 21. For example, the transmission spin torque from the third magnetic layer 23 is injected into the second magnetic layer 22. It is considered that magnetizations that have mutually-reverse orientations are generated in the first and second magnetic layers 21 and 22; and these magnetizations easily oscillate stably.

An example of the behavior of the oscillation of the stacked body 20 will now be described.

Figure 3:
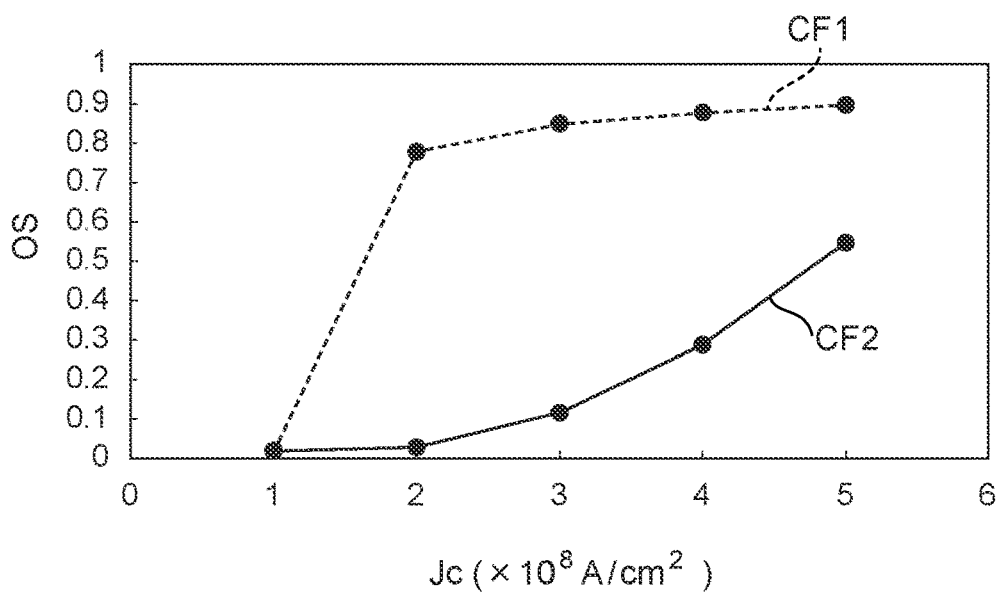
FIG. 3 is a graph illustrating characteristics of a magnetic head of a reference example.

FIG. 3 is a graph illustrating characteristics of a magnetic head of a reference example.

The horizontal axis of FIG. 3 is a current density Jc flowing in the stacked body 20. The vertical axis is an oscillation strength OS (a relative value). In a first configuration CF1 and a second configuration CF2 illustrated in FIG. 3, the stacked body 20 is a general STO that includes one oscillation generation layer and one spin injection layer. The first configuration CF1 shows the measurement result when the stacked body 20 is not provided between a major magnetic pole and a trailing shield, and corresponds to a characteristic of the solitary stacked body 20. The second configuration CF2 corresponds to the measurement result when the same stacked body 20 as the first configuration CF1 is provided between a major magnetic pole and a trailing shield.

As shown in FIG. 3, an oscillation is generated with a low current density Jc in the first configuration CF1 in which the stacked body 20 is not provided between a major magnetic pole and a trailing shield. Conversely, it was found that in the second configuration CF2 in which the stacked body 20 is provided between a major magnetic pole and a trailing shield, a sufficient oscillation is not obtained even when the current density Jc is increased.

It is considered that a sufficient oscillation is not obtained in the second configuration CF2 in which the stacked body 20 is provided between the major magnetic pole and the trailing shield due to an interaction between the magnetization of the oscillation generation layer of the stacked body 20 and the magnetization of the major magnetic pole or the trailing shield. The width in the cross-track direction of the major magnetic pole is less than the width in the cross-track direction of the trailing shield. Therefore, it is considered that the magnetization of the major magnetic pole is easily affected by the magnetization of the stacked body 20. For example, there is a possibility that the magnetization of the major magnetic pole resonates with the magnetization of the stacked body 20. On the other hand, it is considered that the effects from the stacked body 20 on the trailing shield are small and can be ignored because the size of the trailing shield is large.

When the magnetization of the major magnetic pole resonates with the magnetization of the stacked body 20, the oscillation of the stacked body 20 can be stabilized utilizing the resonance. On the other hand, when resonance is not generated in the trailing shield, the effects on the magnetization of the trailing shield from the stacked body 20 become noise.

Accordingly, by increasing the effects on the magnetization of the major magnetic pole from the stacked body 20 while reducing the effects on the magnetization of the trailing shield from the stacked body 20, a stable oscillation is easily obtained while suppressing the noise.

Figure 4A:
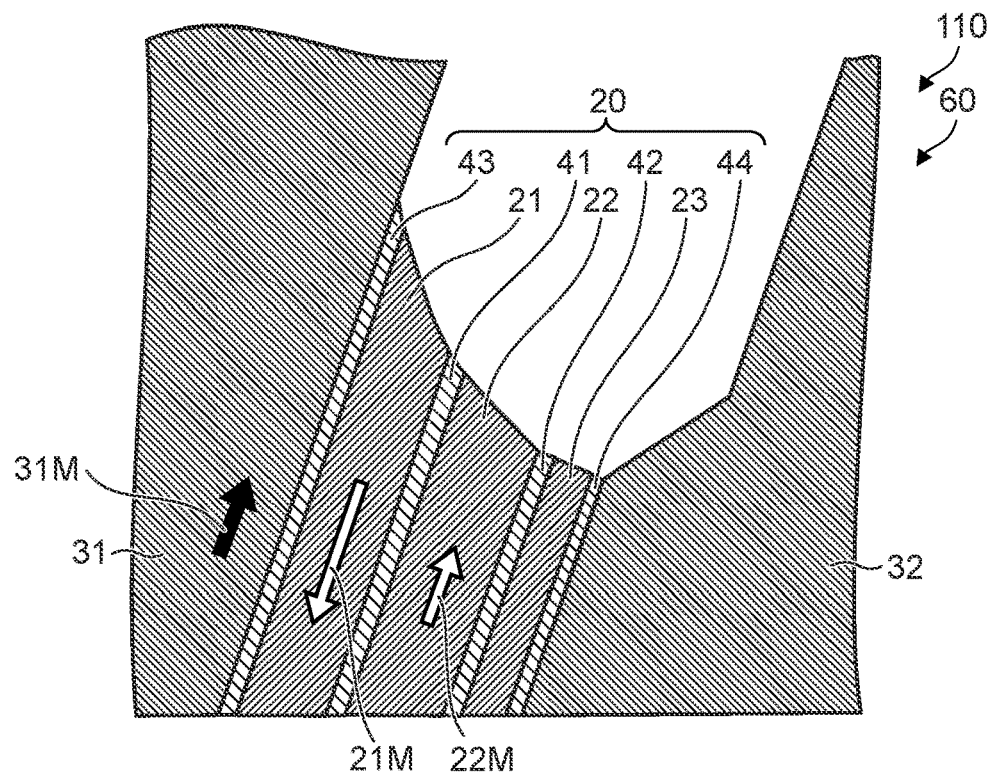
FIGS. 4A and 4B are schematic cross-sectional views illustrating magnetic heads.
Figure 4B:
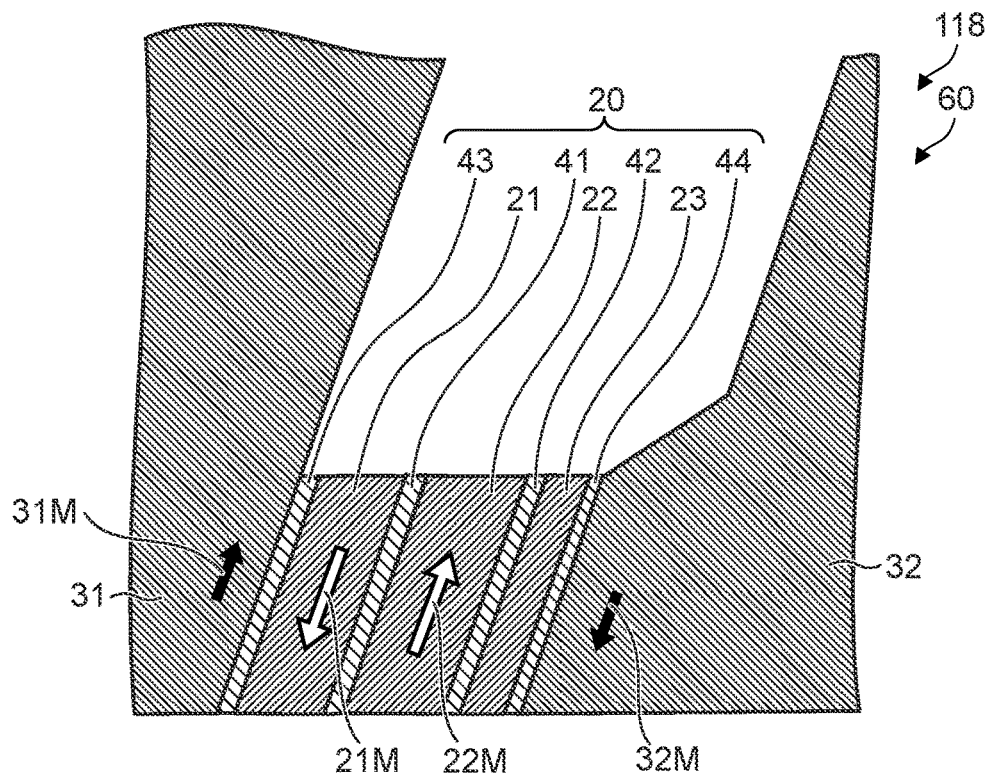

FIGS. 4A and 4B are schematic cross-sectional views illustrating magnetic heads.

FIG. 4A corresponds to the magnetic head 110 according to the embodiment. In the magnetic head 110, the size of the first magnetic layer 21 (the first magnetic layer length L21 referring to FIG. 1A) is greater than the size of the second magnetic layer 22 (the second magnetic layer length L22 referring to FIG. 1A). FIG. 4B corresponds to a magnetic head 118 of a reference example. In the magnetic head 118, the size of the first magnetic layer 21 is equal to the size of the second magnetic layer 22. For example, as shown in FIGS. 4A and 4B, a magnetization 21M of the first magnetic layer 21 and a magnetization 22M of the second magnetic layer 22 are antiparallel.

As shown in FIG. 4B, a magnetic field 31M is generated in the first magnetic pole 31 by effects of the first magnetic layer 21. A magnetic field 32M is generated in the second magnetic pole 32 by effects of the second magnetic layer 22. In the magnetic head 118 of the reference example, the magnetic field 31M is substantially the same as the magnetic field 32M because the size of the first magnetic layer 21 is equal to the size of the second magnetic layer 22.

Conversely, as shown in FIG. 4A, in the magnetic head 110 in which the size of the first magnetic layer 21 is greater than the size of the second magnetic layer 22, the magnetic field 31M is increased by the effects of the first magnetic layer 21; and the magnetic field 32M due to the effects of the second magnetic layer 22 is small or substantially not generated.

Thus, in the magnetic head 110 according to the embodiment, the magnetic field 31M of the first magnetic pole 31 can be increased by setting the first magnetic layer length L21 to be greater than the second magnetic layer length L22. Also, the magnetic field 32M of the second magnetic pole 32 can be suppressed. The interaction between the first magnetic pole 31 and the stacked body 20 can be increased thereby. The noise that is generated by the second magnetic pole 32 can be suppressed.

According to the embodiment, a stable oscillation is easily obtained in the stacked body 20. Stable MAMR can be performed thereby. According to the embodiment, a magnetic head can be provided in which the recording density can be increased.

According to the embodiment, the first nonmagnetic layer 41 includes, for example, at least one selected from the group consisting of Ru, Ir, Ta, and W. The thickness of the first nonmagnetic layer 41 along the first direction D1 is taken as a first nonmagnetic layer thickness t41 (referring to FIG. 1B). According to the embodiment, the first nonmagnetic layer thickness t41 is, for example, not less than 0.2 nm and not more than 3 nm. By such a configuration, the first magnetic layer 21 and the second magnetic layer 22 are easily antiferromagnetically coupling.

By antiferromagnetically coupling the first magnetic layer and the second magnetic layer 22, for example, the perpendicular component (the component along the Z-axis direction) of the alternating current magnetic field generated from the stacked body 20 is suppressed. On the other hand, the in-plane component (the component along the X-Y plane) of the alternating current magnetic field is strengthened. According to the embodiment, for example, the SNR is improved by suppressing the perpendicular component (the component along the Z-axis direction) of the alternating current magnetic field generated from the stacked body 20.

According to the embodiment, the magnetic thickness of the first magnetic layer 21 may be substantially equal to the magnetic thickness of the second magnetic layer 22. For example, a first product of the saturation magnetization of the first magnetic layer 21 and the thickness (a first magnetic layer thickness t21) of the first magnetic layer 21 along the first direction D1 may be substantially equal to a second product of the saturation magnetization of the second magnetic layer 22 and the thickness (a second magnetic layer thickness t22) of the second magnetic layer 22 along the first direction D1. For example, the first product may be not less than 0.8 times and not more than 1.25 times the second product.

For example, the second magnetic layer thickness t22 may be not less than 0.8 times and not more than 1.25 times the first magnetic layer thickness t21.

According to the embodiment, the first magnetic layer thickness t21 is, for example, not less than 5 nm and not more than 15 nm. In one example, the first magnetic layer thickness t21 is, for example, not less than 8 nm and not more than 10 nm. The second magnetic layer thickness t22 is, for example, not less than 5 nm and not more than 15 nm. In one example, the second magnetic layer thickness t22 is, for example, not less than 8 nm and not more than 10 nm.

The thickness of the third magnetic layer 23 along the first direction D1 is taken as a third magnetic layer thickness t23 (referring to FIG. 1B). The third magnetic layer thickness t23 is, for example, less than the first magnetic layer thickness t21 and less than the second magnetic layer thickness t22. The third magnetic layer thickness t23 is, for example, not more than 0.7 times the first magnetic layer thickness t21 and not more than 0.7 times the second magnetic layer thickness t22. The third magnetic layer thickness t23 is, for example, not less than 1 nm and not more than 6 nm. The third magnetic layer thickness t23 may be, for example, not less than 1 nm and not more than 5 nm.

The thickness of the second nonmagnetic layer 42 along the first direction D1 is taken as a second nonmagnetic layer thickness t42 (referring to FIG. 1B). The second nonmagnetic layer thickness t42 is, for example, not less than 1 nm and not more than 5 nm. The thickness of the third nonmagnetic layer 43 along the first direction D1 is taken as a third nonmagnetic layer thickness t43 (referring to FIG. 1B). The third nonmagnetic layer thickness t43 is, for example, not less than 1 nm and not more than 5 nm. The thickness of the fourth nonmagnetic layer 44 along the first direction D1 is taken as a fourth nonmagnetic layer thickness t44 (referring to FIG. 1B). The fourth nonmagnetic layer thickness t44 is, for example, not less than 1 nm and not more than 5 nm. Due to such a thickness, for example, the spin conduction between the layers is easier.

For example, the change of the magnetization of the third magnetic layer 23 is easier. For example, a stable oscillation is easily obtained.

According to the embodiment, the first magnetic layer 21 includes at least one of Fe, Co, or Ni. The second magnetic layer 22 includes at least one of Fe, Co, or Ni. The third magnetic layer 23 includes at least one of Fe, Co, or Ni. For example, these magnetic layers have positive spin polarization.

According to the embodiment, the second nonmagnetic layer 42 and the third nonmagnetic layer 43 each include, for example, at least one selected from the group consisting of Cu, Au, and Ag. For example, a high spin transmittance is obtained in the second and third nonmagnetic layers 42 and 43. For example, a stable oscillation is easily obtained.

According to the embodiment, the fourth nonmagnetic layer 44 includes, for example, at least one selected from the group consisting of Ta, Ru, Ir, and W. For example, an effect of suppressing the spin conduction is obtained in the fourth nonmagnetic layer 44. For example, a stable oscillation is easily obtained.

In the magnetic head 110, an angle θ1 between the first direction D1 and the medium-facing surface 30F (referring to FIG. 1A) may be, for example, not less than 10 degrees and not more than 30 degrees.

Figure 5A:
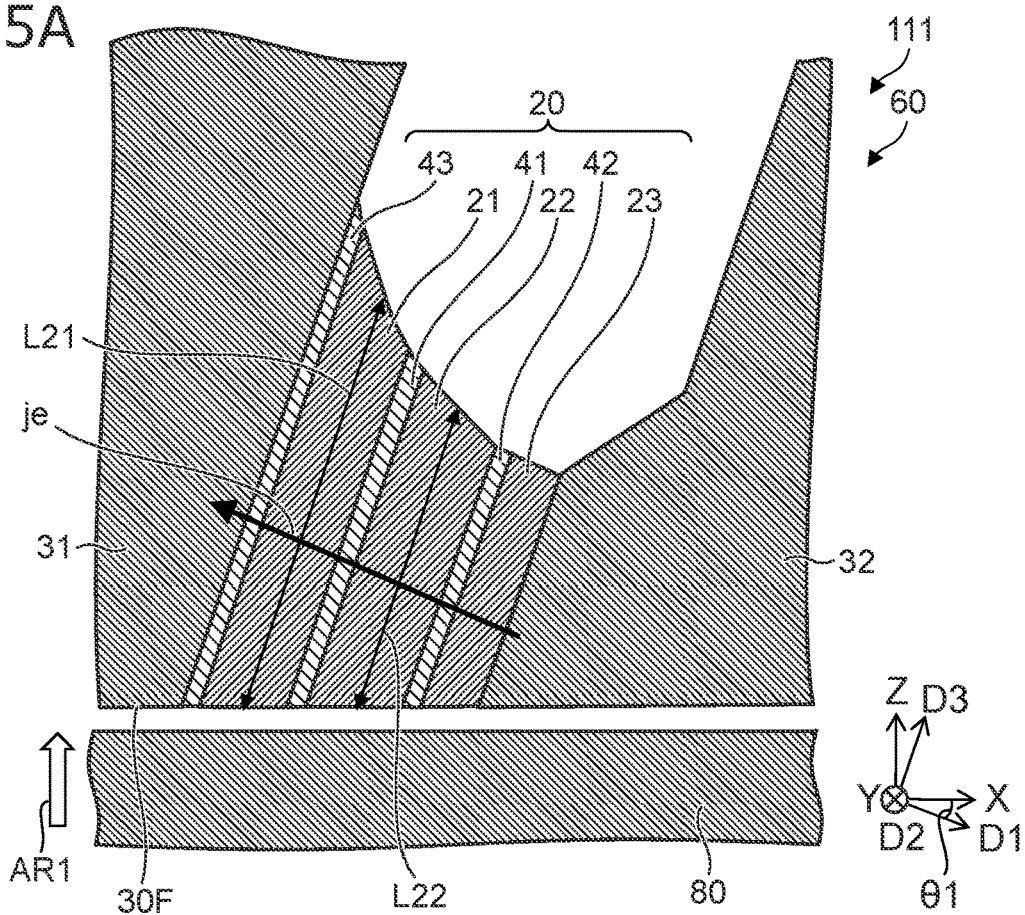
FIGS. 5A and 5B are schematic views illustrating a magnetic head according to the first embodiment.
Figure 5B:
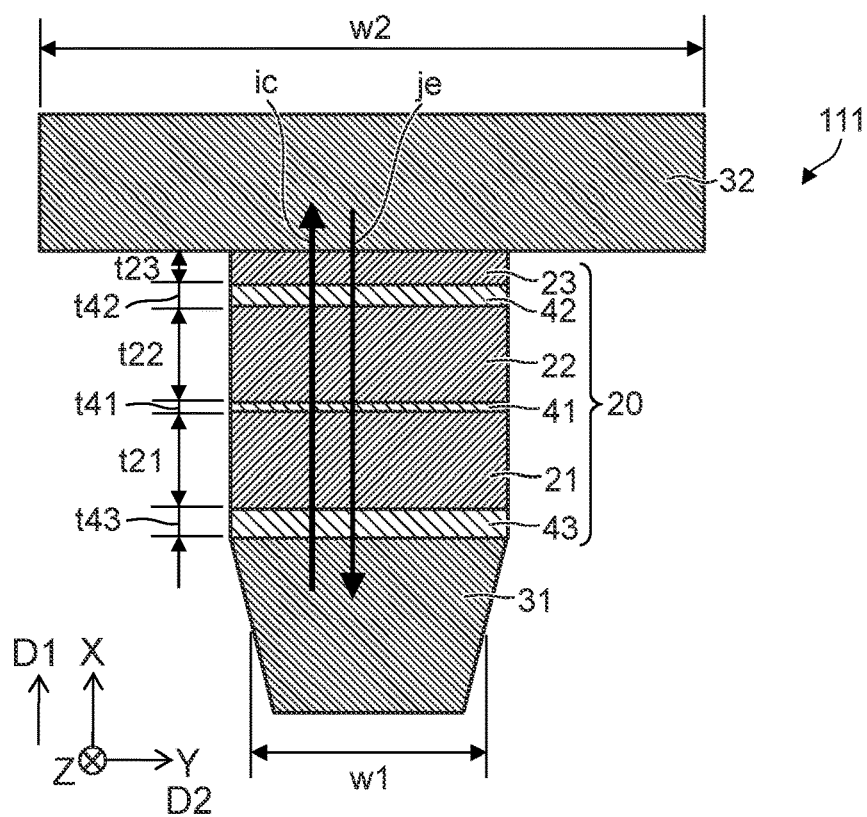

FIGS. 5A and 5B are schematic views illustrating a magnetic head according to the first embodiment.

FIG. 5A is a cross-sectional view. FIG. 5B is a plan view as viewed along arrow AR1 of FIG. 5A.

As shown in FIG. 5A, the recording part 60 of the magnetic head 111 also includes the first magnetic pole 31, the second magnetic pole 32, and the stacked body 20 provided between the first magnetic pole 31 and the second magnetic pole 32. As shown in FIGS. 5A and 5B, the stacked body 20 includes the first to third magnetic layers 21 to 23 and the first to third nonmagnetic layers 41 to 43. The second magnetic layer 22 is located between the first magnetic layer 21 and the second magnetic pole 32. The third magnetic layer 23 is located between the second magnetic layer 22 and the second magnetic pole 32. The first nonmagnetic layer 41 is located between the first magnetic layer 21 and the second magnetic layer 22. The second nonmagnetic layer 42 is located between the second magnetic layer 22 and the third magnetic layer 23. The third nonmagnetic layer 43 is located between the first magnetic pole 31 and the first magnetic layer 21. For example, the third magnetic layer 23 may contact the second magnetic pole 32.

In the magnetic head 111, the first magnetic layer 21 includes at least one of Fe, Co, or Ni. The second magnetic layer 22 includes at least one of Fe, Co, or Ni. The third magnetic layer 23 includes the first element that includes at least one of Fe, Co, or Ni, and includes a second element that includes at least one element selected from the group consisting of Cr, V, Mn, Ti, and Sc. The first magnetic layer 21 and the second magnetic layer 22 do not include the second element described above. Or, the concentrations of the second element in the first and second magnetic layers 21 and 22 are less than the concentration of the second element in the third magnetic layer 23.

For example, the first magnetic layer 21 and the second magnetic layer 22 have positive spin polarization. The third magnetic layer 23 has negative spin polarization.

Otherwise, the configuration described with reference to the magnetic head 110 is applicable to the configuration of the magnetic head 111. For example, the first magnetic layer length L21 is greater than the second magnetic layer length L22. In the magnetic head 111 as well, a stable oscillation is obtained.

For example, as shown in FIG. 5B, the current ic is supplied to the stacked body 20. The current ic is supplied from the electrical circuit 20D (referring to FIG. 2). The current ic has an orientation from the first magnetic layer 21 toward the second magnetic layer 22. The electron current je that accompanies the current ic has an orientation from the second magnetic layer 22 toward the first magnetic layer 21.

Figure 6:
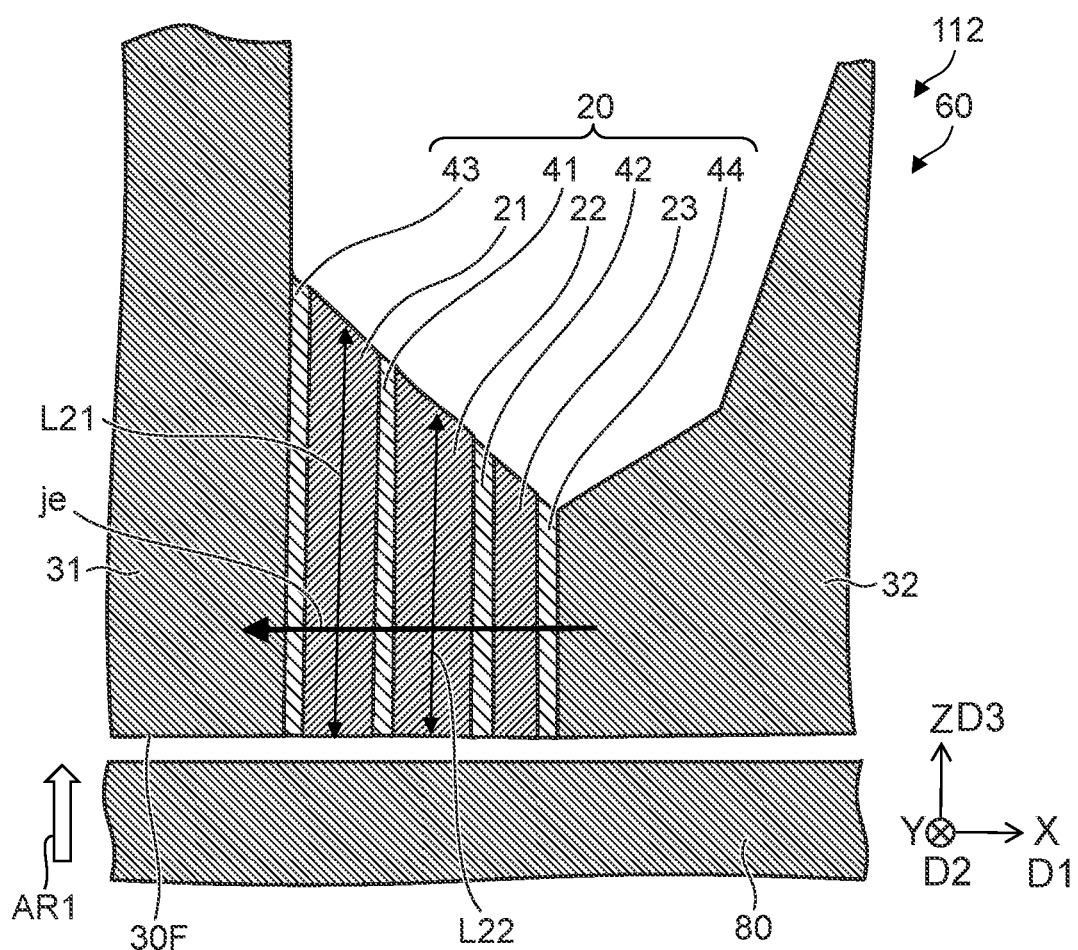
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, the first direction D1 (the stacking direction) is along the medium-facing surface 30F in the magnetic head 112 according to the embodiment. In the magnetic head 112 as well, for example, the first magnetic layer length L21 is greater than the second magnetic layer length L22. Otherwise, the configuration of the magnetic head 112 may be similar to that of the magnetic head 110.

Figure 7:
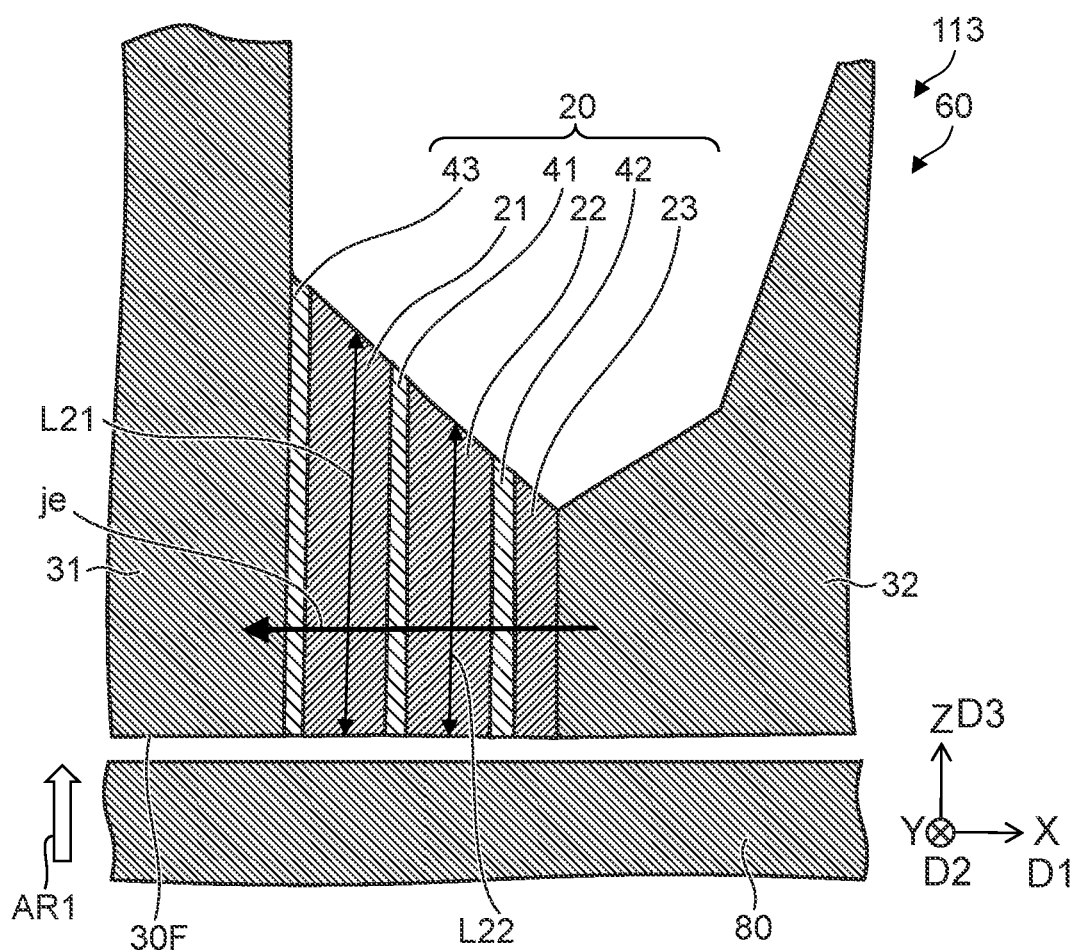
FIG. 7 is a schematic cross-sectional view illustrating a magnetic head according to the first embodiment.

FIG. 7 is a schematic cross-sectional view illustrating a magnetic head according to the first embodiment.

As shown in FIG. 7, the first direction D1 (the stacking direction) is along the medium-facing surface 30F in the magnetic head 113 according to the embodiment. In the magnetic head 113 as well, for example, the first magnetic layer length L21 is greater than the second magnetic layer length L22. Otherwise, the configuration of the magnetic head 113 may be similar to that of the magnetic head 111.

Figure 8:
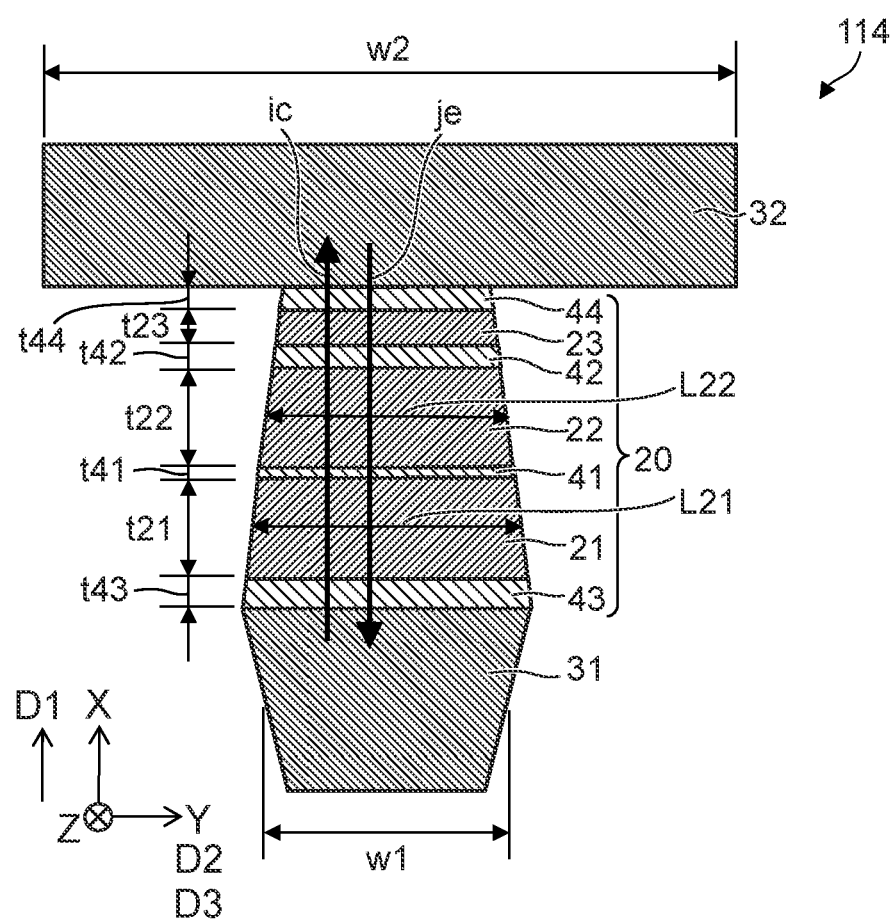
FIG. 8 is a schematic plan view illustrating a magnetic head according to the first embodiment.

FIG. 8 is a schematic plan view illustrating a magnetic head according to the first embodiment.

FIG. 8 corresponds to a plan view as viewed along arrow AR1 of FIG. 1A. In the magnetic head 114 according to the embodiment as shown in FIG. 8, the stacked body 20 includes the first to third magnetic layers 21 to 23 and the first to fourth nonmagnetic layers 41 to 44. As shown in FIG. 8, the third direction D3 is along the second direction D2 (the Y-axis direction, i.e., the cross-track direction). The first magnetic layer length L21 of the first magnetic layer 21 along the third direction D3 is greater than the second magnetic layer length L22 of the second magnetic layer 22 along the third direction D3. Otherwise, the configuration of the magnetic head 114 may be similar to that of the magnetic head 110.

Figure 9:
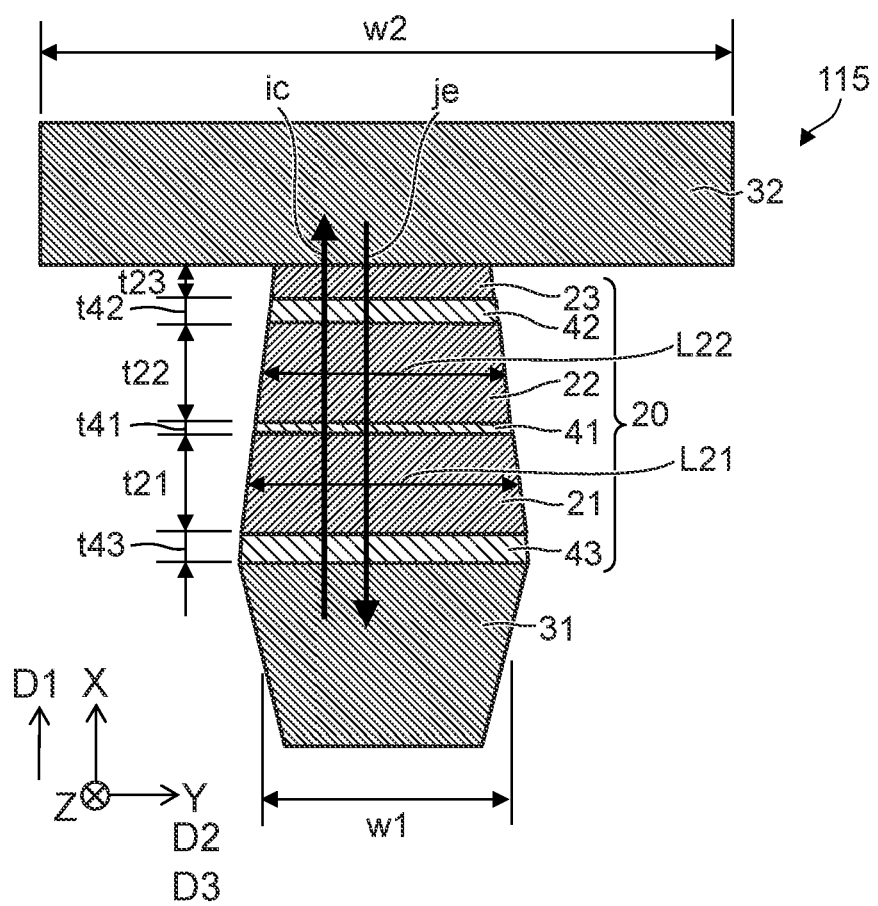
FIG. 9 is a schematic plan view illustrating a magnetic head according to the first embodiment.

FIG. 9 is a schematic plan view illustrating a magnetic head according to the first embodiment.

FIG. 9 corresponds to a plan view as viewed along arrow AR1 of FIG. 5A. In the magnetic head 115 according to the embodiment as shown in FIG. 9, the stacked body 20 includes the first to third magnetic layers 21 to 23 and the first to third nonmagnetic layers 41 to 43. As shown in FIG. 9, the third direction D3 is along the second direction D2 (the Y-axis direction, i.e., the cross-track direction). The first magnetic layer length L21 of the first magnetic layer 21 along the third direction D3 is greater than the second magnetic layer length L22 of the second magnetic layer 22 along the third direction D3. Otherwise, the configuration of the magnetic head 115 may be similar to that of the magnetic head 111.

In the magnetic heads 112 to 115 as well, a stable oscillation is obtained.

Second Embodiment

Figure 10A:
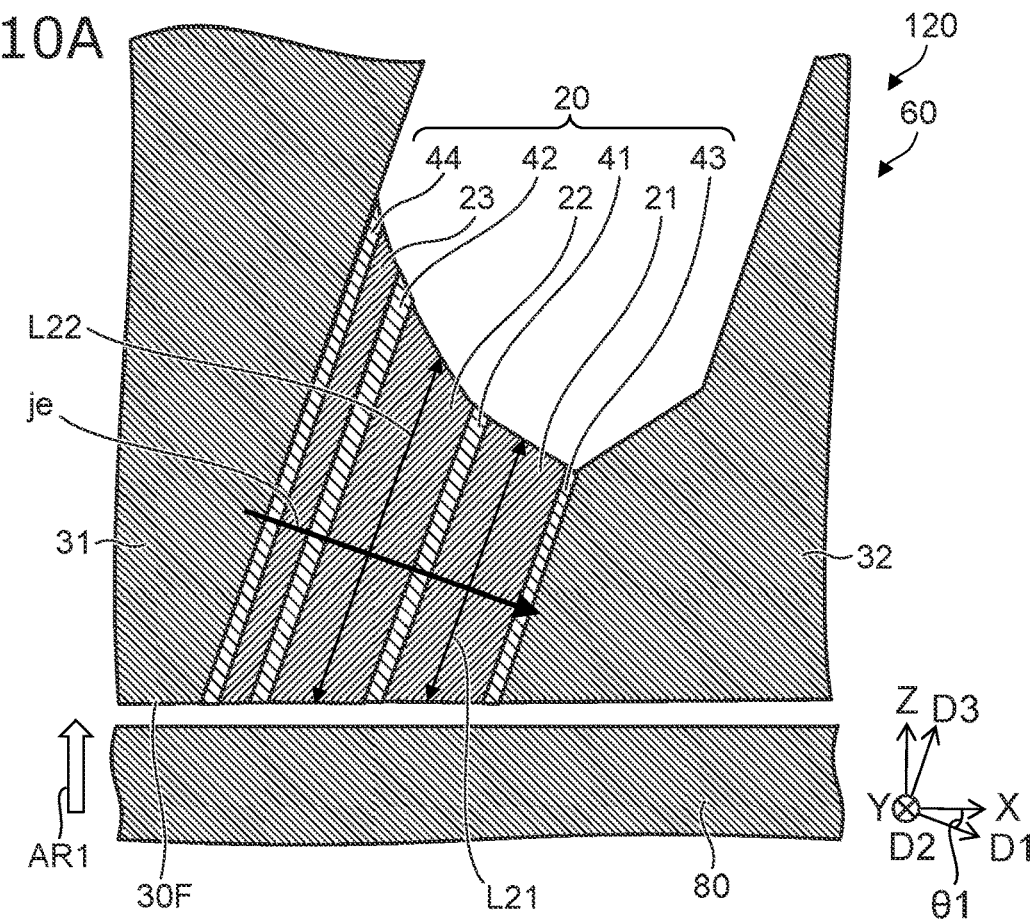
FIGS. 10A and 10B are schematic views illustrating a magnetic head according to a second embodiment.
Figure 10B:
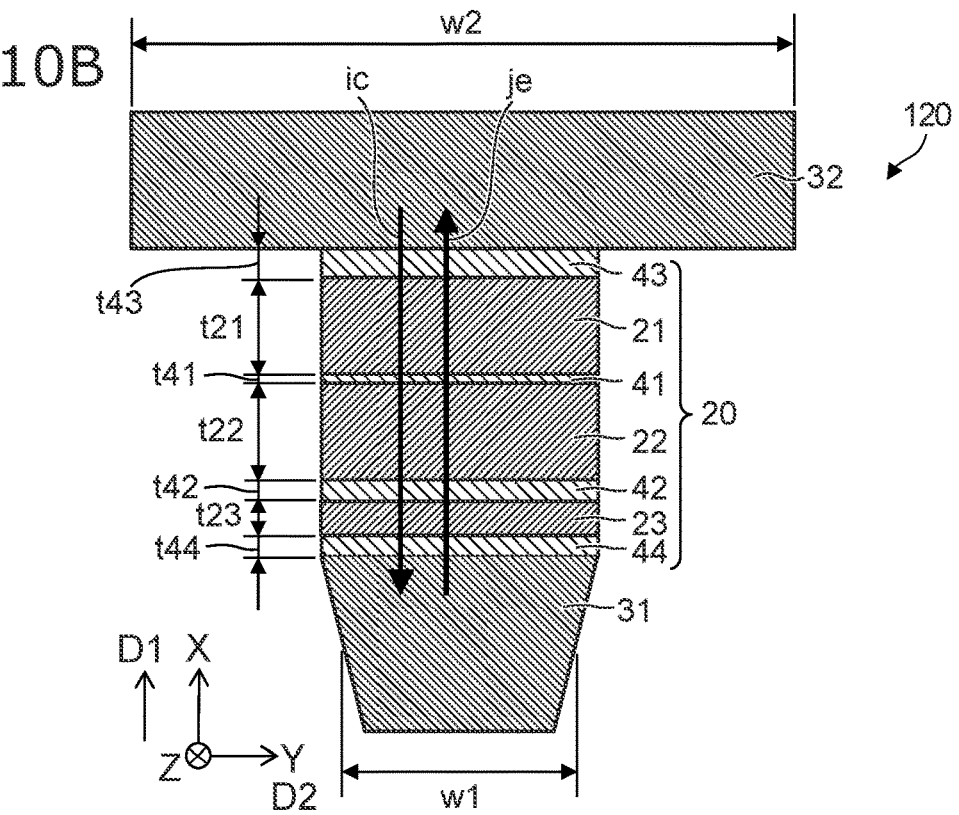

FIGS. 10A and 10B are schematic views illustrating a magnetic head according to a second embodiment.

FIG. 10A is a cross-sectional view. FIG. 10B is a plan view as viewed along arrow AR1 of FIG. 10A.

As shown in FIG. 10A, the magnetic head 120 according to the embodiment also includes the first magnetic pole 31, the second magnetic pole 32, and the stacked body 20 provided between the first magnetic pole 31 and the second magnetic pole 32. The sequence of the multiple layers included in the stacked body 20 of the magnetic head 120 is different from the sequence of the multiple layers of the magnetic head 110. Otherwise, the configuration of the magnetic head 120 may be similar to the configuration of the magnetic head 110.

In the magnetic head 120 as shown in FIGS. 10A and 10B, the stacked body 20 includes the first to third magnetic layers 21 to 23 and the first to fourth nonmagnetic layers 41 to 44. The second magnetic layer 22 is located between the first magnetic pole 31 and the first magnetic layer 21. The third magnetic layer 23 is located between the first magnetic pole 31 and the second magnetic layer 22. The first nonmagnetic layer 41 is located between the second magnetic layer 22 and the first magnetic layer 21. The second nonmagnetic layer 42 is located between the third magnetic layer 23 and the second magnetic layer 22. The third nonmagnetic layer 43 is located between the first magnetic layer 21 and the second magnetic pole 32. The fourth nonmagnetic layer 44 is located between the first magnetic pole 31 and the third magnetic layer 23.

As shown in FIG. 10B, the current ic is supplied to the stacked body 20. The current ic is supplied from the electrical circuit 20D (referring to FIG. 2). The current ic has an orientation from the first magnetic layer 21 toward the second magnetic layer 22. The electron current je that accompanies the current ic has an orientation from the second magnetic layer 22 toward the first magnetic layer 21.

For example, the spin torque that is reflected by the second magnetic pole 32 acts on the first magnetic layer 21. For example, the transmission spin torque from the third magnetic layer 23 is injected into the second magnetic layer 22. It is considered that magnetizations that have mutually-reverse orientations are generated in the first and second magnetic layers 21 and 22; and these magnetizations easily oscillate stably. For example, the first magnetic layer 21 and the second magnetic layer 22 function as oscillation generation layers. The third magnetic layer 23 functions as a spin injection layer. The magnetization of the third magnetic layer 23 is not fixed in a designated direction. MAMR can be performed in the magnetic head 120.

The direction from the second magnetic layer 22 toward the first magnetic layer 21 is taken as the first direction D1. A direction that is along the medium-facing surface 30F of the first magnetic pole 31 and is perpendicular to the first direction D1 is taken as the second direction D2. The second direction D2 is, for example, the Y-axis direction (the cross-track direction). As shown in FIG. 10B, the first magnetic pole length w1 of the first magnetic pole 31 along the second direction D2 is less than the second magnetic pole length w2 of the second magnetic pole 32 along the second direction D2.

As shown in FIG. 10A, one direction perpendicular to the first direction D1 is taken as the third direction D3. In the example, the third direction D3 crosses the second direction D2. In the example, the first direction D1 is oblique to the medium-facing surface 30F. The third direction D3 is oblique to the medium-facing surface 30F. The second magnetic layer length L22 of the second magnetic layer 22 along the third direction D3 is greater than the first magnetic layer length L21 of the first magnetic layer 21 along the third direction D3.

The magnetic field 31M of the first magnetic pole 31 can be increased by such a configuration. Also, the magnetic field 32M of the second magnetic pole 32 can be suppressed. The interaction between the first magnetic pole 31 and the stacked body 20 can be increased thereby. The noise that is generated by the second magnetic pole 32 can be suppressed.

According to the embodiment, a stable oscillation is easily obtained in the stacked body 20. Stable MAMR can be performed thereby. According to the embodiment, a magnetic head can be provided in which the recording density can be increased.

The configuration described with reference to the magnetic head 110 is applicable to the magnetic head 120. For example, in the magnetic head 120, the first nonmagnetic layer 41 includes at least one selected from the group consisting of Ru, Ir, Ta, and W. The first nonmagnetic layer thickness t41 of the first nonmagnetic layer 41 along the first direction D1 (referring to FIG. 10B) is, for example, not less than 0.2 nm and not more than 3 nm. By antiferromagnetically coupling the first magnetic layer 21 and the second magnetic layer 22, for example, the magnetic field that is due to the magnetization of the first magnetic layer 21 and the magnetic field that is due to the magnetization of the second magnetic layer 22 are substantially canceled. The perpendicular component (the component along the Z-axis direction) of the alternating current magnetic field generated from the stacked body 20 is suppressed thereby. On the other hand, the in-plane component (the component along the X-Y plane) of the alternating current magnetic field is strengthened. According to the embodiment, for example, the SNR is improved by suppressing the perpendicular component (the component along the Z-axis direction) of the alternating current magnetic field generated from the stacked body 20.

Figure 11A:
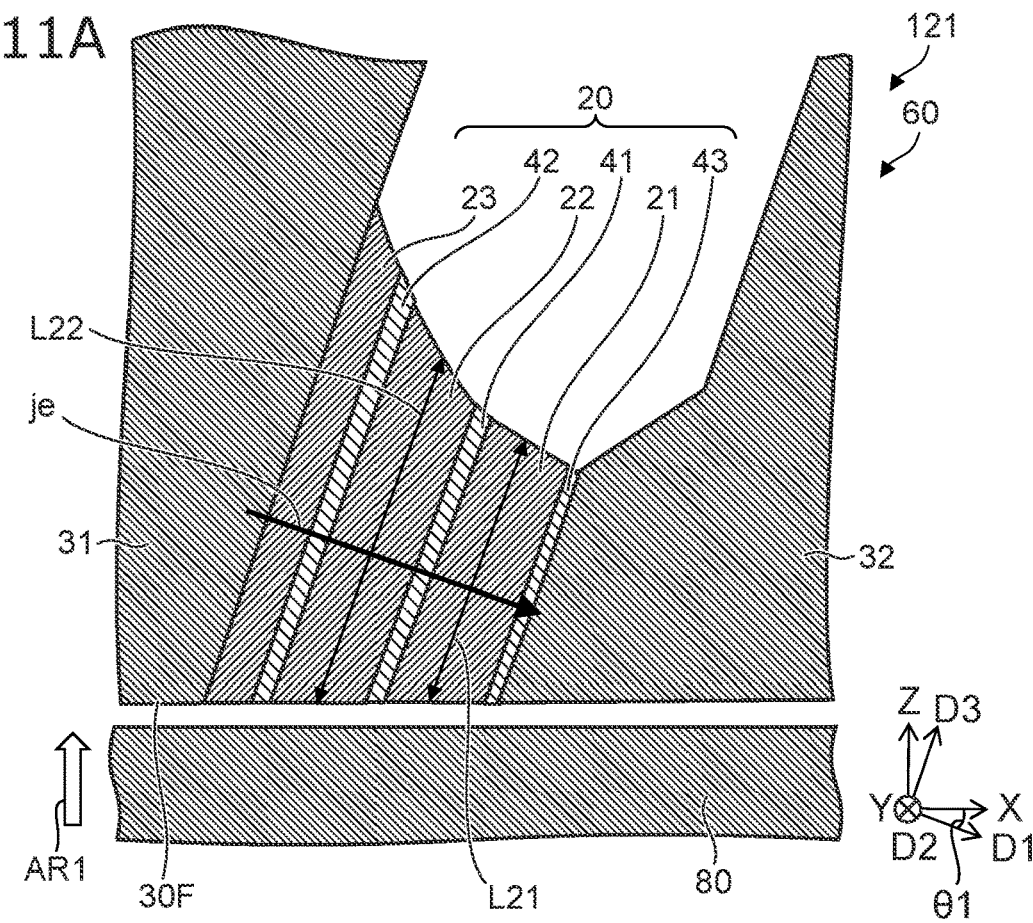
FIGS. 11A and 11B are schematic views illustrating a magnetic head according to the second embodiment.
Figure 11B:
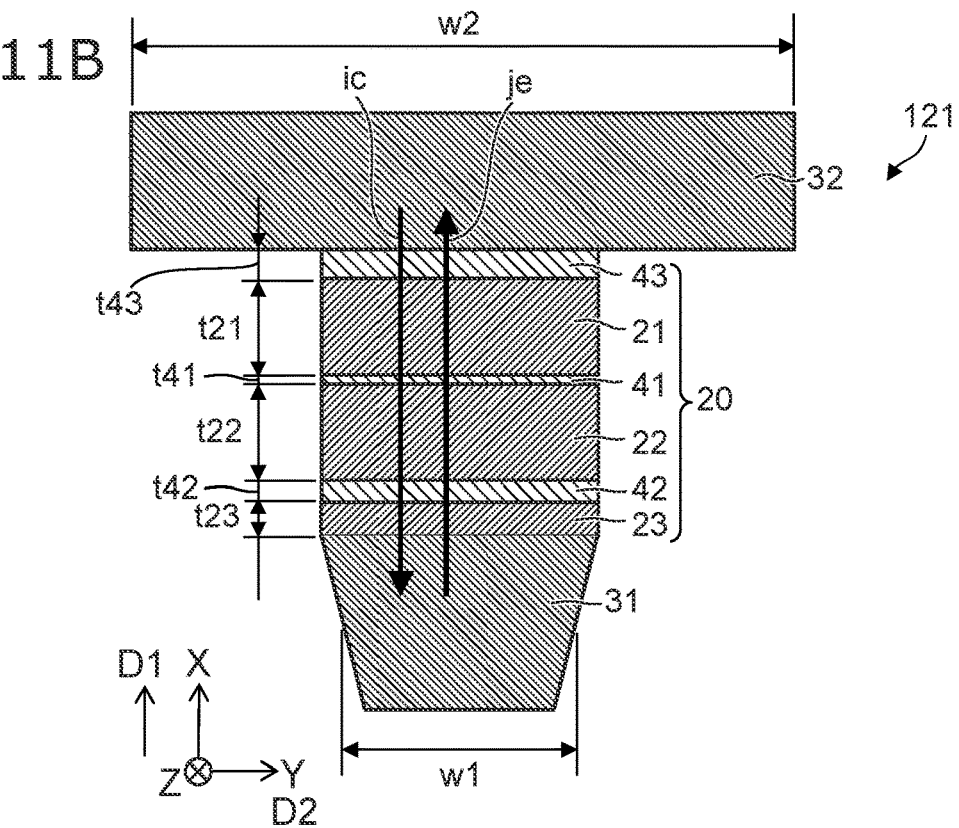

FIGS. 11A and 11B are schematic views illustrating a magnetic head according to the second embodiment.

FIG. 11A is a cross-sectional view. FIG. 11B is a plan view as viewed along arrow AR1 of FIG. 11A.

As shown in FIG. 11A, the recording part 60 of the magnetic head 121 also includes the first magnetic pole 31, the second magnetic pole 32, and the stacked body 20 provided between the first magnetic pole 31 and the second magnetic pole 32. As shown in FIGS. 11A and 11B, the stacked body 20 includes the first to third magnetic layers 21 to 23 and the first to third nonmagnetic layers 41 to 43. The second magnetic layer 22 is located between the first magnetic layer 21 and the second magnetic pole 32. The third magnetic layer 23 is located between the second magnetic layer 22 and the second magnetic pole 32. The first nonmagnetic layer 41 is located between the first magnetic layer 21 and the second magnetic layer 22. The second nonmagnetic layer 42 is located between the second magnetic layer 22 and the third magnetic layer 23. The third nonmagnetic layer 43 is located between the first magnetic pole 31 and the first magnetic layer 21. For example, the third magnetic layer 23 may contact the second magnetic pole 32.

In the magnetic head 121, the first magnetic layer 21 includes at least one of Fe, Co, or Ni. The second magnetic layer 22 includes at least one of Fe, Co, or Ni. The third magnetic layer 23 includes the first element that includes at least one of Fe, Co, or Ni, and includes the second element that includes at least one selected from the group consisting of Cr, V, Mn, Ti, and Sc. The first magnetic layer 21 and the second magnetic layer 22 do not include the second element described above. Or, the concentrations of the second element in the first and second magnetic layers 21 and 22 are less than the concentration of the second element in the third magnetic layer 23.

For example, the first magnetic layer 21 and the second magnetic layer 22 have positive spin polarization. The third magnetic layer 23 has negative spin polarization.

Otherwise, the configuration described with reference to the magnetic head 120 is applicable to the configuration of the magnetic head 121. For example, the first magnetic layer length L21 is greater than the second magnetic layer length L22. In the magnetic head 121 as well, a stable oscillation is obtained.

For example, as shown in FIG. 11B, the current ic is supplied to the stacked body 20. The current ic is supplied from the electrical circuit 20D (referring to FIG. 2). The current ic has an orientation from the first magnetic layer 21 toward the second magnetic layer 22. The electron current je that accompanies the current ic has an orientation from the second magnetic layer 22 toward the first magnetic layer 21.

Figure 12:
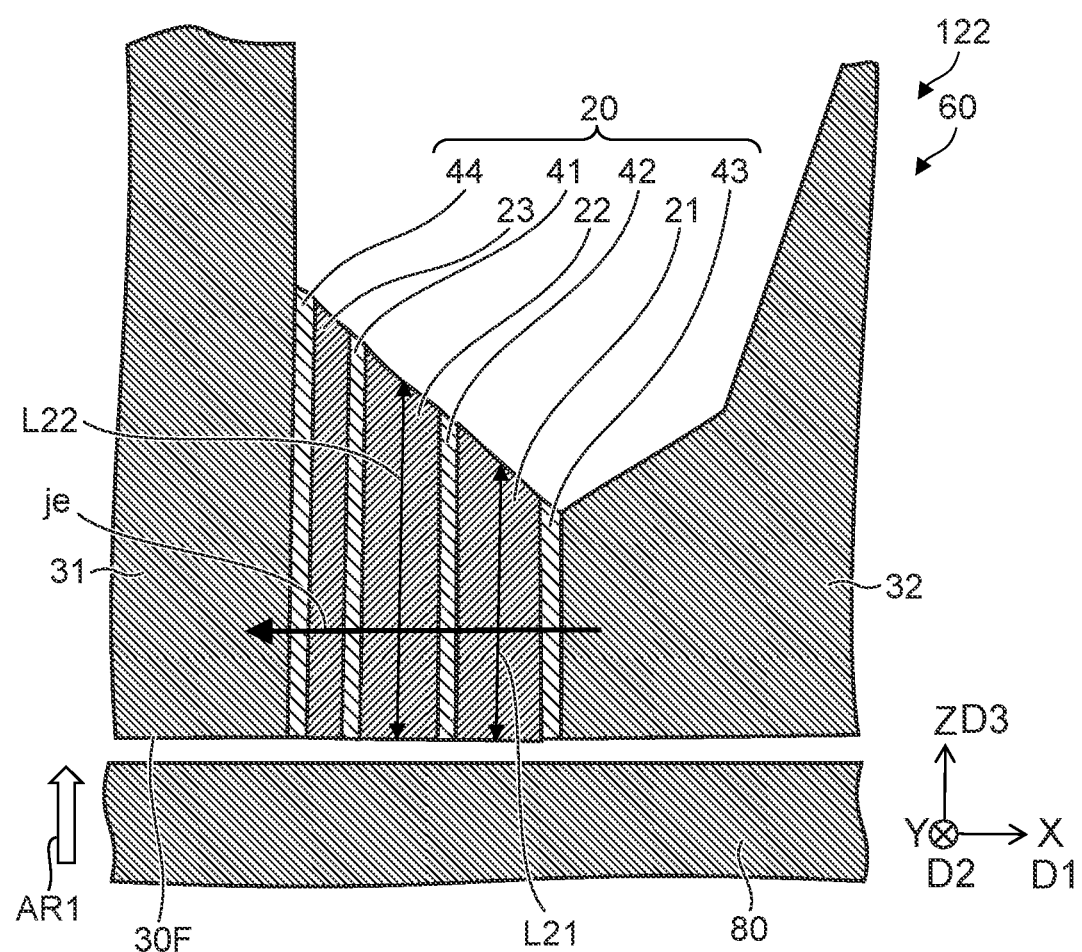
FIG. 12 is a schematic cross-sectional view illustrating a magnetic head according to the second embodiment.

FIG. 12 is a schematic cross-sectional view illustrating a magnetic head according to the second embodiment.

In the magnetic head 122 according to the embodiment as shown in FIG. 12, the first direction D1 (the stacking direction) is along the medium-facing surface 30F. In the magnetic head 122 as well, for example, the first magnetic layer length L21 is greater than the second magnetic layer length L22. Otherwise, the configuration of the magnetic head 122 may be similar to that of the magnetic head 120.

Figure 13:
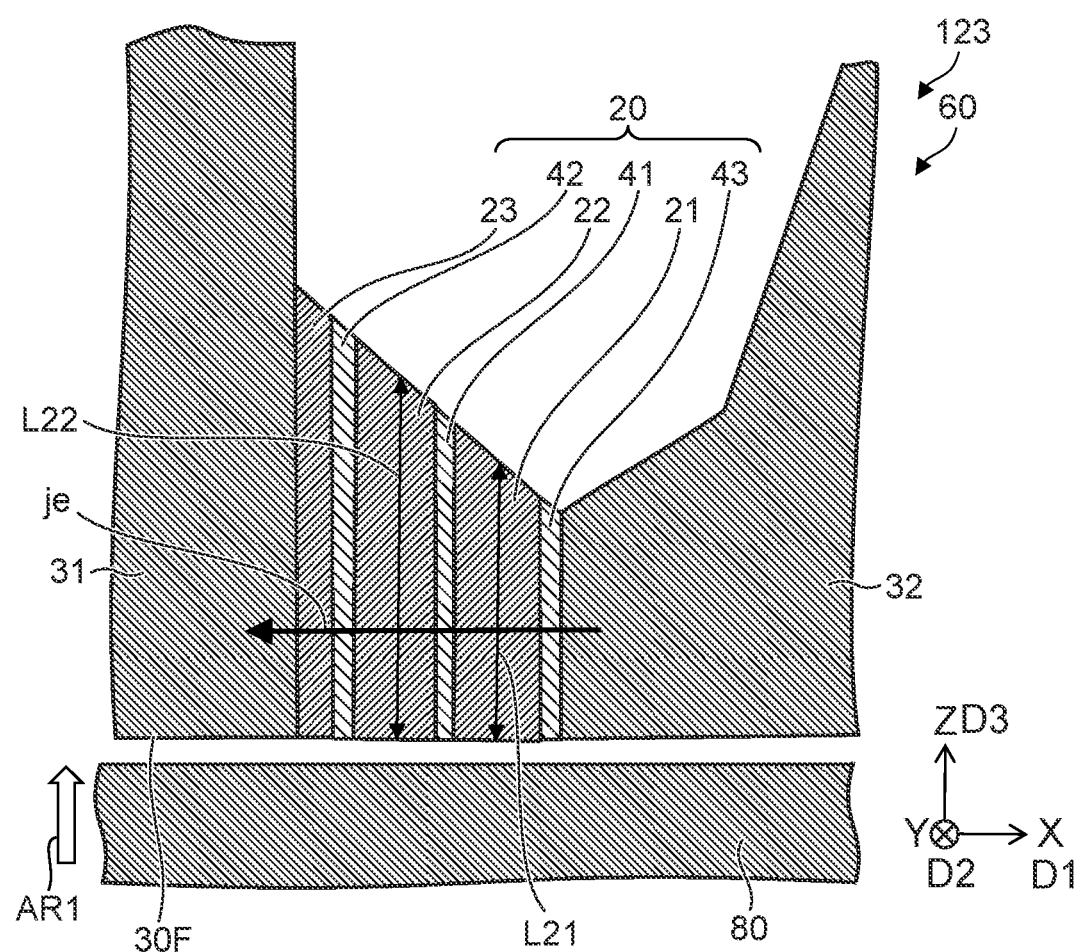
FIG. 13 is a schematic cross-sectional view illustrating a magnetic head according to the second embodiment.

FIG. 13 is a schematic cross-sectional view illustrating a magnetic head according to the second embodiment.

In the magnetic head 123 according to the embodiment as shown in FIG. 13, the first direction D1 (the stacking direction) is along the medium-facing surface 30F. In the magnetic head 123 as well, for example, the first magnetic layer length L21 is greater than the second magnetic layer length L22. Otherwise, the configuration of the magnetic head 123 may be similar to that of the magnetic head 121.

Figure 14:
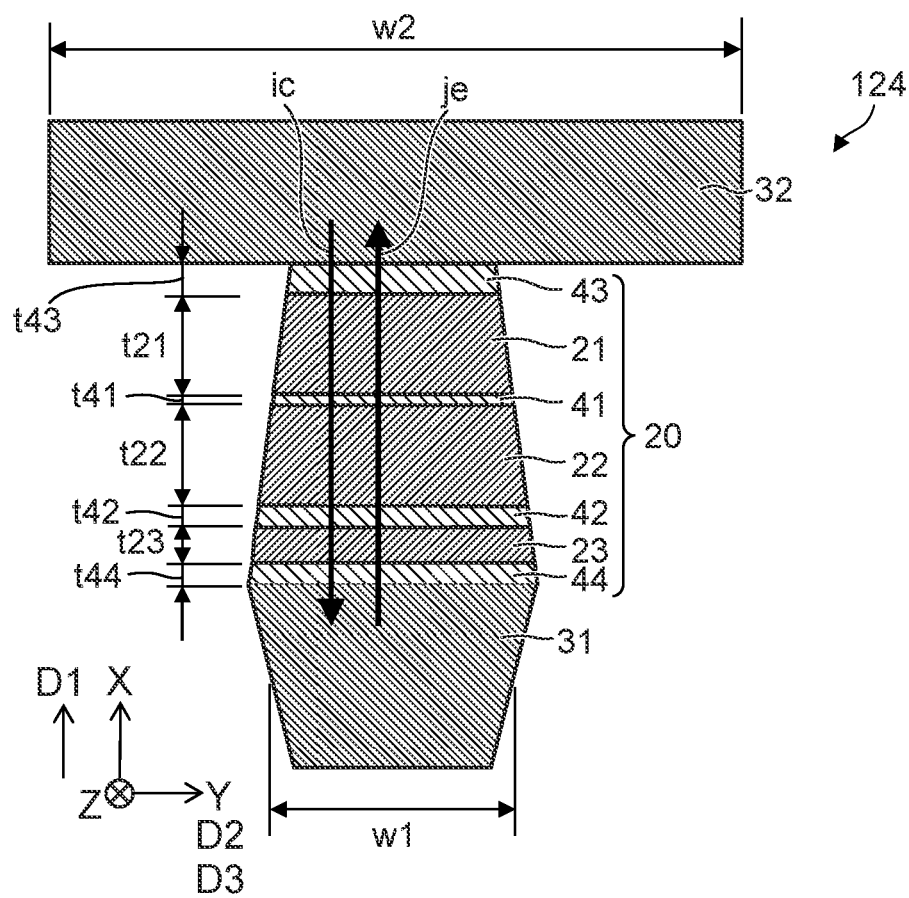
FIG. 14 is a schematic plan view illustrating a magnetic head according to the second embodiment.

FIG. 14 is a schematic plan view illustrating a magnetic head according to the second embodiment.

FIG. 14 corresponds to a plan view as viewed along arrow AR1 of FIG. 10A. In the magnetic head 124 according to the embodiment as shown in FIG. 14, the stacked body 20 includes the first to third magnetic layers 21 to 23 and the first to fourth nonmagnetic layers 41 to 44. As shown in FIG. 14, the third direction D3 is along the second direction D2 (the Y-axis direction, i.e., the cross-track direction). The first magnetic layer length L21 of the first magnetic layer 21 along the third direction D3 is greater than the second magnetic layer length L22 of the second magnetic layer 22 along the third direction D3. Otherwise, the configuration of the magnetic head 124 may be similar to that of the magnetic head 120.

Figure 15:
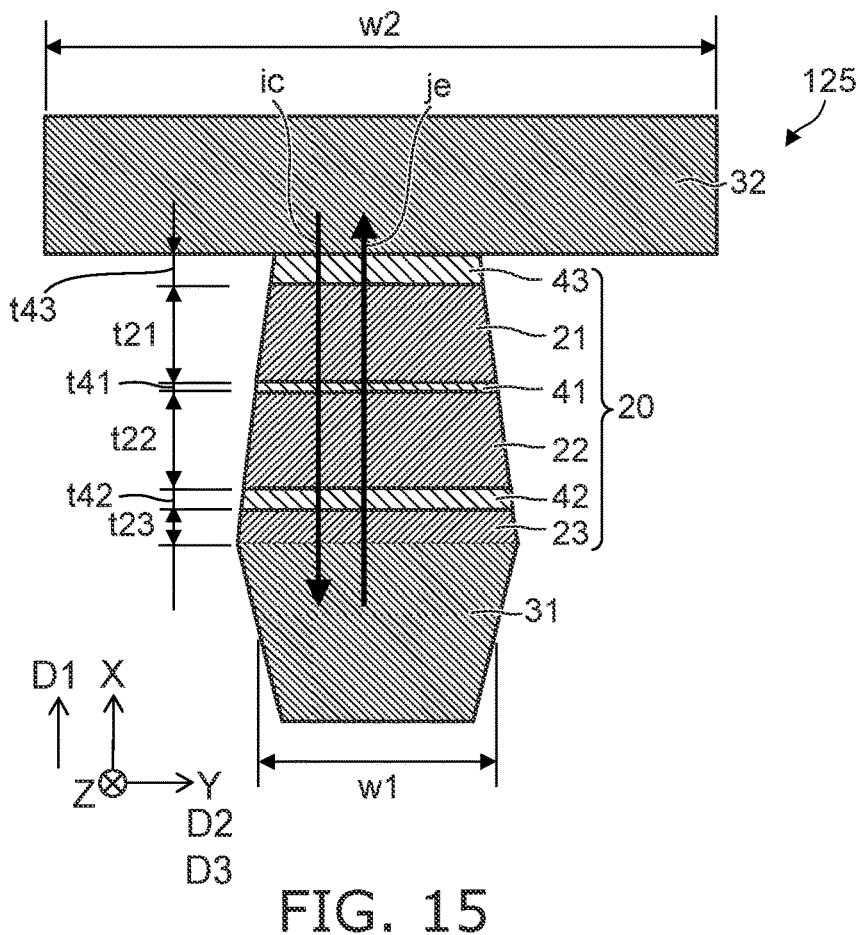
FIG. 15 is a schematic plan view illustrating a magnetic head according to the second embodiment.

FIG. 15 is a schematic plan view illustrating a magnetic head according to the second embodiment.

FIG. 15 corresponds to a plan view as viewed along arrow AR1 of FIG. 11A. In the magnetic head 125 according to the embodiment as shown in FIG. 15, the stacked body 20 includes the first to third magnetic layers 21 to 23 and the first to third nonmagnetic layers 41 to 43. As shown in FIG. 15, the third direction D3 is along the second direction D2 (the Y-axis direction, i.e., the cross-track direction). The first magnetic layer length L21 of the first magnetic layer 21 along the third direction D3 is greater than the second magnetic layer length L22 of the second magnetic layer 22 along the third direction D3. Otherwise, the configuration of the magnetic head 125 may be similar to that of the magnetic head 121.

In the magnetic heads 122 to 125 as well, a stable oscillation is obtained.

The configuration described with reference to the magnetic head 110 is applicable to the first to third magnetic layers 21 to 23 and the first to third nonmagnetic layers 41 to 43 of the magnetic heads 111 to 115 and the magnetic heads 120 to 125.

For example, the magnetic thickness of the first magnetic layer 21 may be not less than 0.8 times and not more than 1.25 times the magnetic thickness of the second magnetic layer 22 in the magnetic heads 111 to 115 and the magnetic heads 120 to 125. For example, the second magnetic layer thickness t22 may be not less than 0.8 times and not more than 1.25 times the first magnetic layer thickness t21. The first magnetic layer thickness t21 is, for example, not less than 5 nm and not more than 15 nm. The second magnetic layer thickness t22 is, for example, not less than 5 nm and not more than 15 nm.

The third magnetic layer thickness t23 is, for example, less than the first magnetic layer thickness t21 and less than the second magnetic layer thickness t22. The third magnetic layer thickness t23 is, for example, not more than 0.7 times the first magnetic layer thickness t21 and not more than 0.7 times the second magnetic layer thickness t22. The first to third magnetic layers 21 to 23 include at least one of Fe, Co, or Ni.

In the magnetic heads 111 to 115 and the magnetic heads 120 to 125, the second nonmagnetic layer 42 and the third nonmagnetic layer 43 each include, for example, at least one selected from the group consisting of Cu, Au, and Ag. The second nonmagnetic layer thickness t42 is, for example, not less than 1 nm and not more than 5 nm. The third nonmagnetic layer thickness t43 is, for example, not less than 1 nm and not more than 5 nm.

The magnetic heads 111 to 115 and 120 to 125 according to the embodiment may be used with the electrical circuit 20D described above (referring to FIG. 2). The electrical circuit 20D and the magnetic head according to the embodiment are included in the magnetic recording device 210 according to the embodiment (referring to FIG. 2). The magnetic recording device 210 may include the magnetic recording medium 80.

Figure 16:
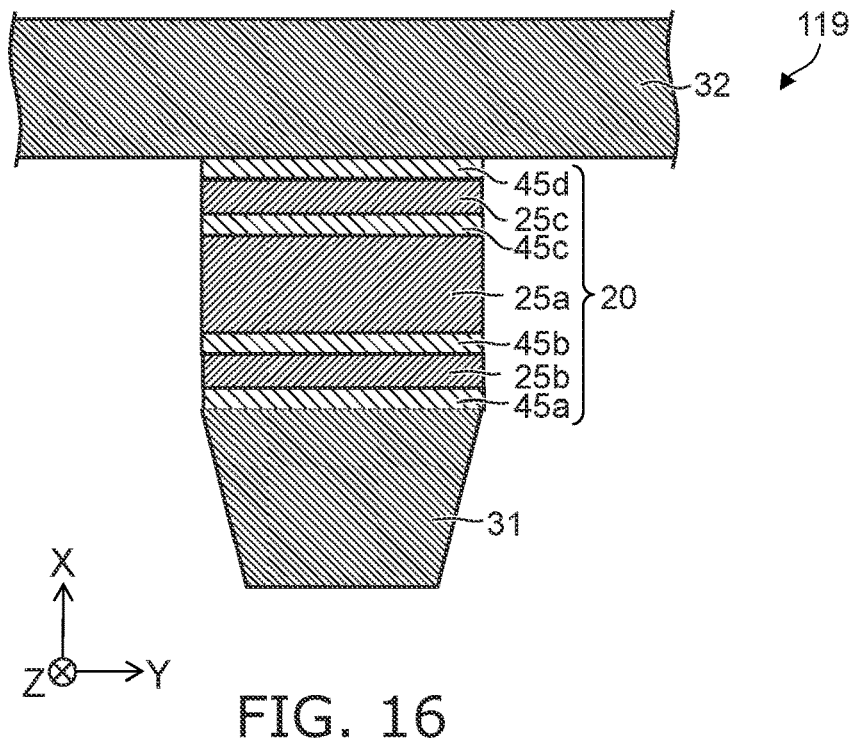
FIG. 16 is a schematic plan view illustrating a magnetic head of a reference example.

FIG. 16 is a schematic plan view illustrating a magnetic head of a reference example.

In the magnetic head 119 of the reference example as shown in FIG. 16, the stacked body 20 includes a magnetic layer 25a, a magnetic layer 25b, and a magnetic layer 25c. The magnetic layer 25b is located between the first magnetic pole 31 and the magnetic layer 25a. The magnetic layer 25c is located between the magnetic layer 25a and the second magnetic pole 32. A nonmagnetic layer 45a is located between the first magnetic pole 31 and the magnetic layer 25b. A nonmagnetic layer 45b is located between the magnetic layer 25b and the magnetic layer 25a. A nonmagnetic layer 45c is located between the magnetic layer 25a and the magnetic layer 25c. A nonmagnetic layer 45d is located between the magnetic layer 25c and the second magnetic pole 32. In the magnetic head 119, the magnetic layer 25a functions as an oscillation generation layer. The magnetic layer 25b and the magnetic layer 25c function as spin injection layers. In the magnetic head 119, spin is injected into the magnetic layer 25a from both the magnetic layer 25b and the magnetic layer 25c.

An example of simulation results of characteristics of the magnetic head 119 of the reference example and the magnetic head 120 according to the embodiment will now be described. In the model of the simulation of the magnetic head 119, the thickness of the magnetic layer 25a is 9 nm, and the thicknesses of the magnetic layer 25b and the magnetic layer 25c are 6 nm. The distance (the recording gap) between the first magnetic pole 31 and the second magnetic pole 32 is 27 nm.

In the model of the simulation of the magnetic head 120, the thickness (the first magnetic layer thickness t21) of the first magnetic layer 21 is 9 nm, and the thickness (the second magnetic layer thickness t22) of the second magnetic layer 22 is 9 nm. The thickness (the third magnetic layer thickness t23) of the third magnetic layer 23 is 2 nm. In the magnetic head 120, the distance (the recording gap) between the first magnetic pole 31 and the second magnetic pole 32 is 27 nm.

Figure 17:
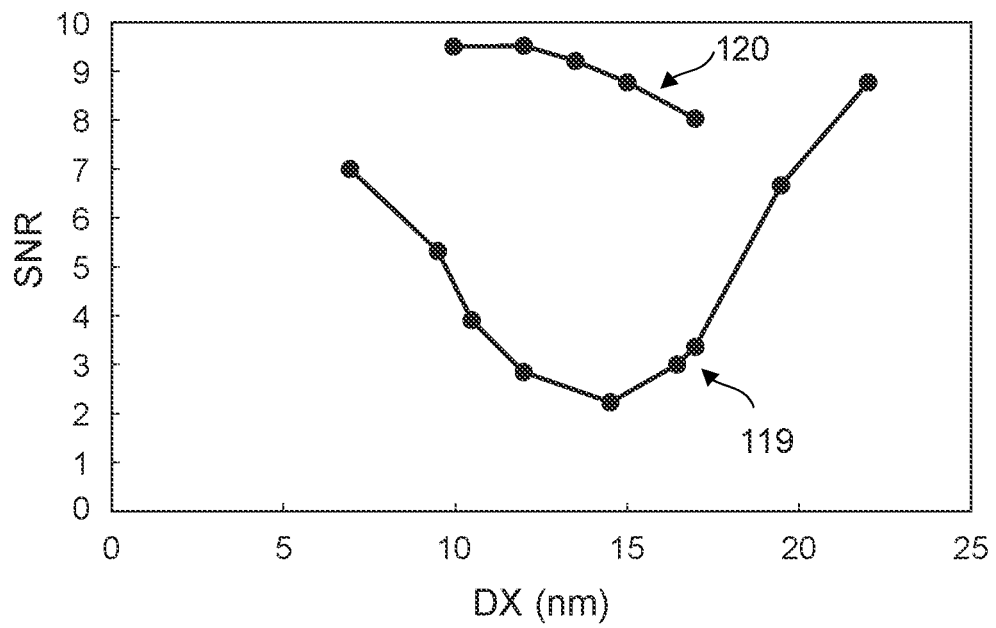
FIG. 17 is a graph illustrating the characteristics of the magnetic heads.

FIG. 17 is a graph illustrating the characteristics of the magnetic heads. The horizontal axis of FIG. 17 is a position DX in the X-axis direction. The position DX of 0 nm corresponds to the X-axis direction end (the end at the side facing the second magnetic pole 32) of the first magnetic pole 31. The vertical axis of FIG. 17 is the SN ratio SNR (signal to noise ratio). In the example, the SN ratio SNR for recording "2T" with a linear recording density of 2800 kFCI (Flux Change per Inch) is shown. In FIG. 17, practical recording is possible when the position DX is in the range not less than about 10 nm and not more than about 17.5 nm.

In the magnetic head 119 of the reference example as shown in FIG. 17, the SN ratio SNR is not less than about 2 and not more than about 4 in the practical range of the position DX. Conversely, in the magnetic head 120 according to the embodiment, the SN ratio SNR is not less than about 8 and not more than about 9.5 in the practical range of the position DX. Thus, a higher SN ratio SNR is obtained in the embodiment than in the reference example.

It is considered that a high SN ratio SNR is obtained in the embodiment because the component along the Z-axis direction of the rotating magnetic field (the alternating current magnetic field) is suppressed.

Figure 18:
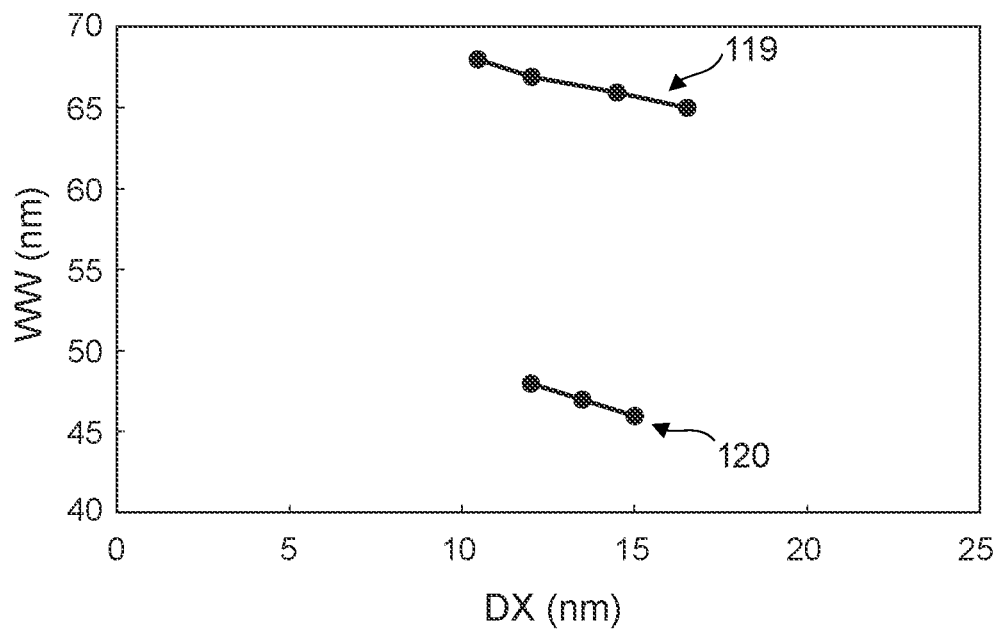
FIG. 18 is a graph illustrating characteristics of the magnetic heads.

FIG. 18 is a graph illustrating characteristics of the magnetic heads.

The horizontal axis of FIG. 18 is the position DX in the X-axis direction. The position DX of 0 nm corresponds to the X-axis direction end (the end at the side facing the second magnetic pole 32) of the first magnetic pole 31. The vertical axis of FIG. 18 is a recording width WW. In the example, the recording width WW for recording "2T" with a linear recording density of 2800 kFCI (the Flux Change per Inch) is shown. The recording width WW corresponds to the range in which the signal strength obtained when recording and reproducing is not less than 50% of the peak intensity.

In the magnetic head 119 of the reference example as shown in FIG. 18, the recording width WW is not less than about 66 nm and not more than about 68 nm in the practical range of the position DX. Conversely, in the magnetic head 120 according to the embodiment, the recording width WW is not less than about 46 nm and not more than about 48 nm in the practical range of the position DX. Thus, a smaller recording width WW is obtained in the embodiment than in the reference example.

It is considered that a small recording width WW is obtained in the embodiment because the component along the Z-axis direction of the rotating magnetic field (the alternating current magnetic field) is suppressed.

An example of the magnetic recording medium 80 and the magnetic head included in the magnetic recording device 210 according to the embodiment will now be described. In the description recited below, the magnetic heads (the magnetic heads 110 to 115, 120 to 125, etc.) and modifications of the magnetic heads according to the first and second embodiments are applicable.

Figure 19:
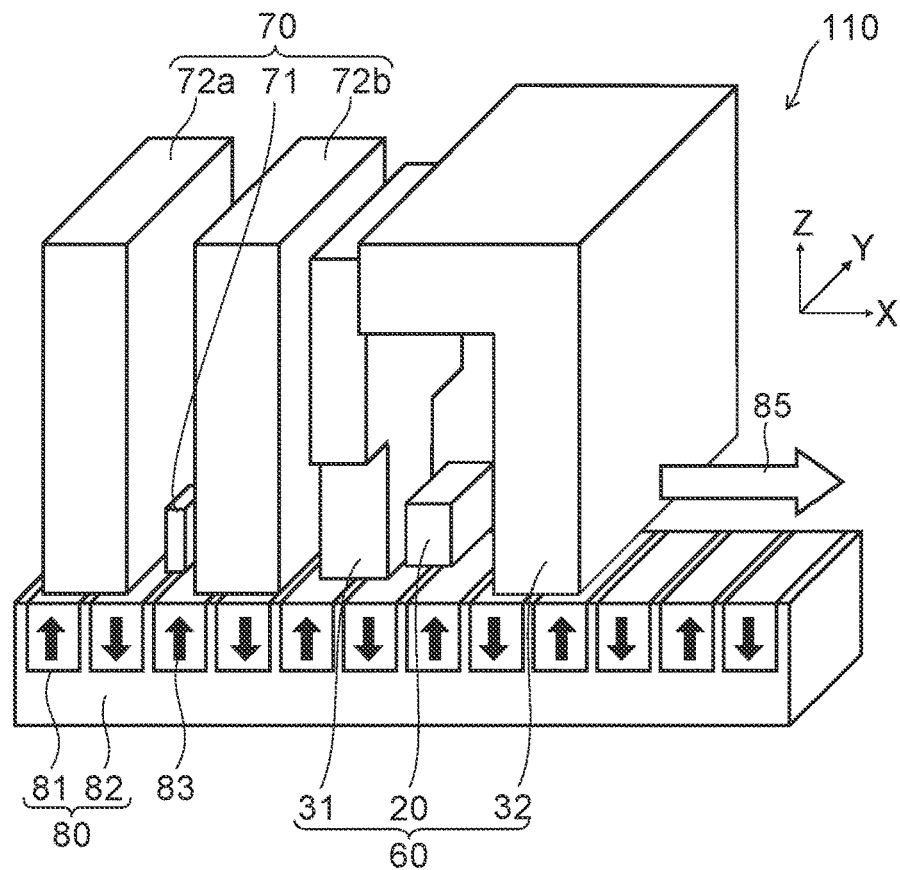
FIG. 19 is a schematic perspective view illustrating the magnetic recording device according to the embodiment.

FIG. 19 is a schematic perspective view illustrating the magnetic recording device according to the embodiment.

As shown in FIG. 19, the magnetic head (e.g., the magnetic head 110) according to the embodiment is used with the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is located between the first reproduction magnetic shield 72a and the second reproduction magnetic shield 72b. The magnetic reproducing element 71 is configured to output a signal corresponding to the magnetization 83 of the magnetic recording layer 81.

As shown in FIG. 19, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 20:
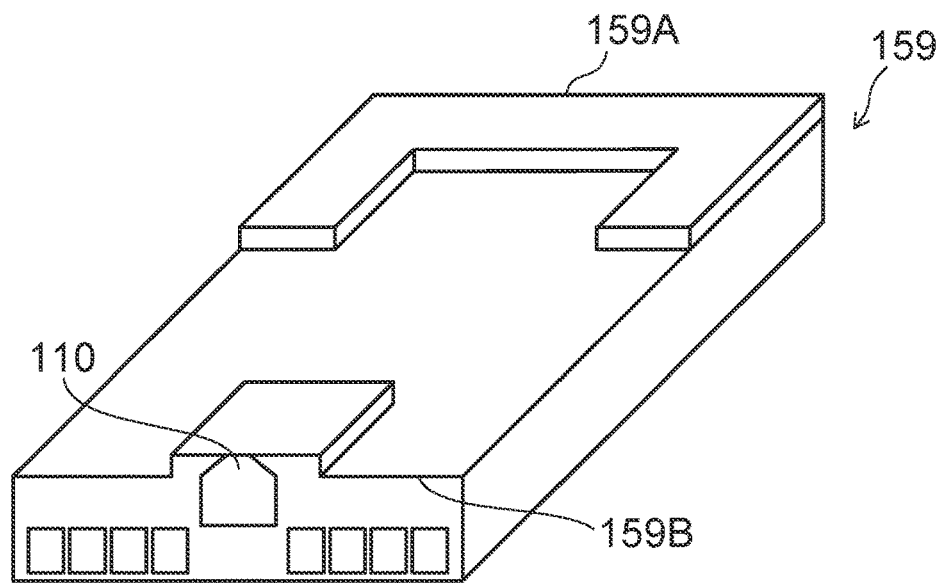
FIG. 20 is a schematic perspective view illustrating a portion of the magnetic recording device according to the embodiment.

FIG. 20 is a schematic perspective view illustrating a portion of the magnetic recording device according to the embodiment.

FIG. 20 illustrates a head slider.

The magnetic head 110 is provided in the head slider 159. The head slider 159 includes, for example, Al$_2$O$_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is located at the side surface of the air outflow side 159B of the head slider 159 or the like. Thereby, the magnetic head 110 moves relative to the magnetic recording medium while flying over or contacting the magnetic recording medium.

Figure 21:
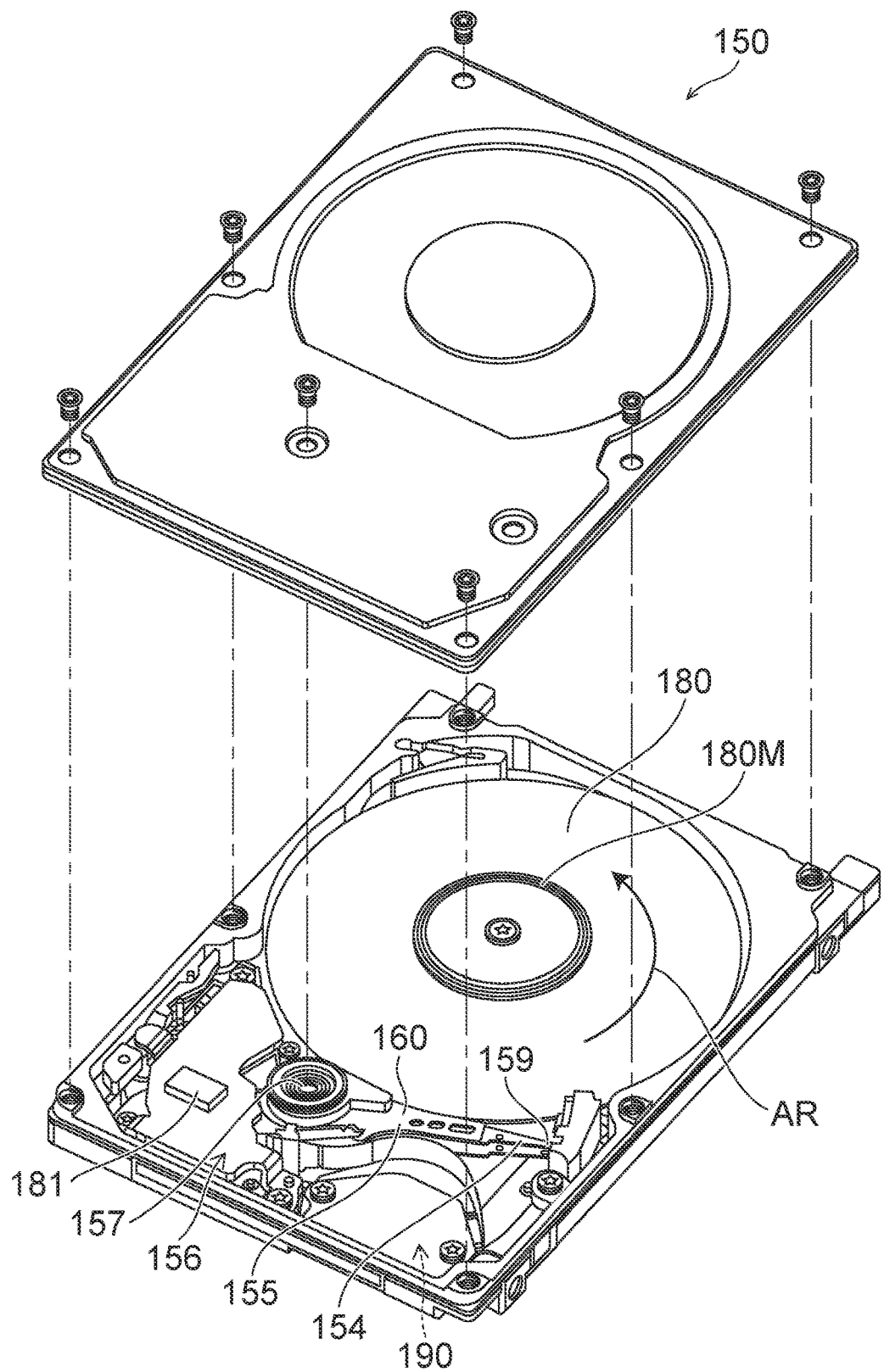
FIG. 21 is a schematic perspective view illustrating a magnetic recording device according to the embodiment.

FIG. 21 is a schematic perspective view illustrating a magnetic recording device according to the embodiment.

Figure 22A:
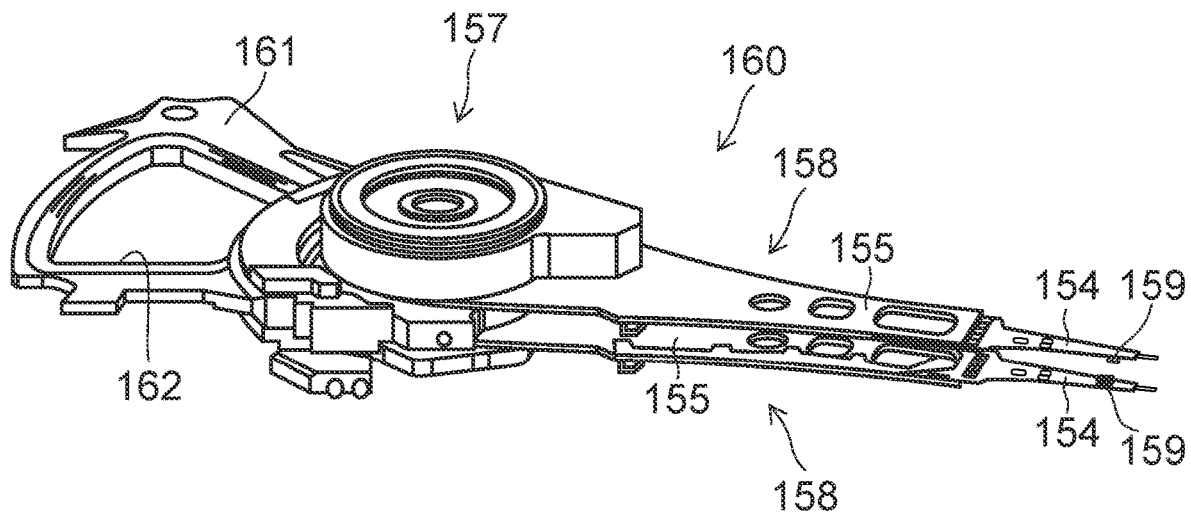
FIGS. 22A and 22B are schematic perspective views illustrating a portion of the magnetic recording device according to the embodiment.
Figure 22B:
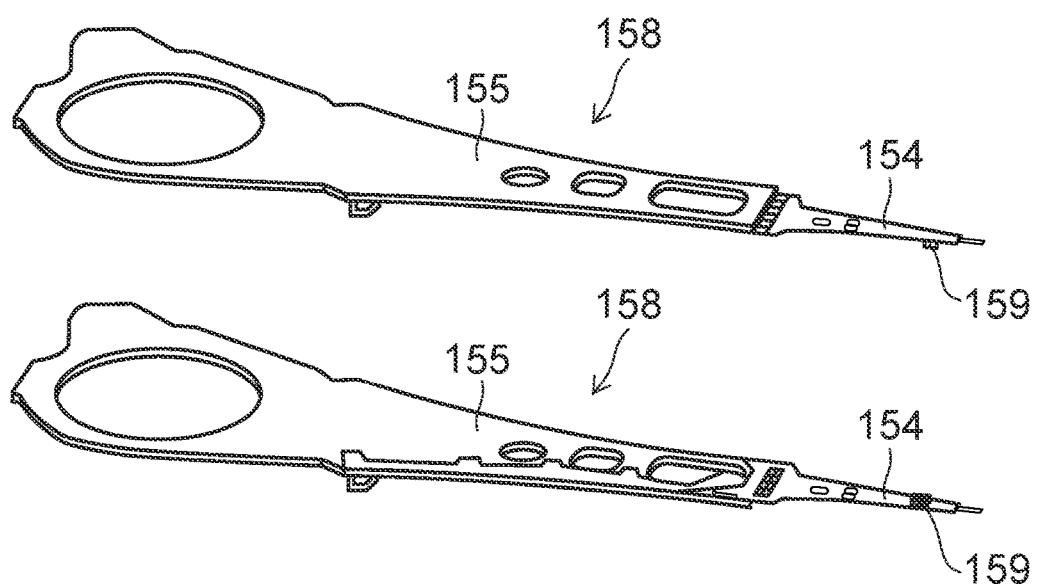

FIGS. 22A and 22B are schematic perspective views illustrating a portion of the magnetic recording device according to the embodiment.

As shown in FIG. 21, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 22A illustrates the configuration of a portion of the magnetic recording device and is an enlarged perspective view of a head stack assembly 160.

FIG. 22B is a perspective view illustrating a magnetic head assembly (a head gimbal assembly (HGA)) 158 that is a portion of the head stack assembly 160.

As shown in FIG. 22A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 22B, the head gimbal assembly 158 includes the arm 155 extending from the bearing part 157, and the suspension 154 extending from the arm 155.

The head slider 159 is provided at the tip of the suspension 154. The magnetic head according to the embodiment is provided in the head slider 159.

The magnetic head assembly (the head gimbal assembly) 158 according to the embodiment includes the magnetic head according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

Embodiments may include the following configurations (e.g., technological proposals).

Configuration 1

A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic layer and the second magnetic pole,
a third magnetic layer provided between the second magnetic layer and the second magnetic pole,
a first nonmagnetic layer provided between the first magnetic layer and the second magnetic layer,
a second nonmagnetic layer provided between the second magnetic layer and the third magnetic layer, and
a third nonmagnetic layer provided between the first magnetic pole and the first magnetic layer,
a first magnetic pole length of the first magnetic pole along a second direction being less than a second magnetic pole length of the second magnetic pole along the second direction,
the second direction being along a medium-facing surface of the first magnetic pole and being perpendicular to a first direction from the first magnetic layer toward the second magnetic layer,
a first magnetic layer length of the first magnetic layer along a third direction perpendicular to the first direction being greater than a second magnetic layer length of the second magnetic layer along the third direction.

Configuration 2

The magnetic head according to Configuration 1, wherein the third direction crosses the second direction.

Configuration 3

The magnetic head according to Configuration 2, wherein the first direction is oblique to the medium-facing surface.

Configuration 4

The magnetic head according to Configuration 1, wherein the third direction is along the second direction.

Configuration 5

The magnetic head according to any one of Configurations 1 to 4, wherein
the stacked body further includes a fourth nonmagnetic layer provided between the third magnetic layer and the second magnetic pole,
the first magnetic layer includes at least one of Fe, Co, or Ni,
the second magnetic layer includes at least one of Fe, Co, or Ni, and
the third magnetic layer includes at least one of Fe, Co, or Ni.

Configuration 6

The magnetic head according to any one of Configurations 1 to 4, wherein
the first magnetic layer includes at least one of Fe, Co, or Ni,
the second magnetic layer includes at least one of Fe, Co, or Ni,
the third magnetic layer includes:
a first element including at least one of Fe, Co, or Ni; and
a second element including at least one selected from the group consisting of Cr, V, Mn, Ti, and Sc, and the first magnetic layer and the second magnetic layer do not include the second element, or concentrations of the second element in the first and second magnetic layers are less than a concentration of the second element in the third magnetic layer.

Configuration 7

The magnetic head according to Configuration 6, wherein the third magnetic layer contacts the second magnetic pole.

Configuration 8

A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the second magnetic layer and the first magnetic layer,
a second nonmagnetic layer provided between the third magnetic layer and the second magnetic layer, and
a third nonmagnetic layer provided between the first magnetic layer and the second magnetic pole,
a first magnetic pole length of the first magnetic pole along a second direction being less than a second magnetic pole length of the second magnetic pole along the second direction,
the second direction being along a medium-facing surface of the first magnetic pole and being perpendicular to a first direction from the second magnetic layer toward the first magnetic layer,
a second magnetic layer length of the second magnetic layer along a third direction perpendicular to the first direction being greater than a first magnetic layer length of the first magnetic layer along the third direction.

Configuration 9

The magnetic head according to Configuration 8, wherein the third direction crosses the second direction.

Configuration 10

The magnetic head according to Configuration 9, wherein the first direction is oblique to the medium-facing surface.

Configuration 11

The magnetic head according to Configuration 8, wherein the third direction is along the second direction.

Configuration 12

The magnetic head according to any one of Configurations 8 to 11, wherein
the stacked body further includes a fourth nonmagnetic layer provided between the first magnetic pole and the third magnetic layer,
the first magnetic layer includes at least one of Fe, Co, or Ni,
the second magnetic layer includes at least one of Fe, Co, or Ni, and
the third magnetic layer includes at least one of Fe, Co, or Ni.

Configuration 13

The magnetic head according to any one of Configurations 8 to 11, wherein
the first magnetic layer includes at least one of Fe, Co, or Ni,
the second magnetic layer includes at least one of Fe, Co, or Ni, the third magnetic layer includes:
a first element including at least one of Fe, Co, or Ni; and
a second element including at least one selected from the group consisting of Cr, V, Mn, Ti, and Sc, and
the first magnetic layer and the second magnetic layer do not include the second element, or concentrations of the second element in the first and second magnetic layers are less than a concentration of the second element in the third magnetic layer.

Configuration 14

The magnetic head according to Configuration 13, wherein
the third magnetic layer contacts the first magnetic pole.

Configuration 15

The magnetic head according to any one of Configurations 1 to 14, wherein
the first nonmagnetic layer includes at least one selected from the group consisting of Ru, Ir, Ta, and W, and
a thickness of the first nonmagnetic layer along the first direction is not less than 0.2 nm and not more than 3 nm.

Configuration 16

The magnetic head according to any one of Configurations 1 to 15, wherein
a first product of a saturation magnetization of the first magnetic layer and a first magnetic layer thickness of the first magnetic layer along the first direction is not less than 0.8 times and not more than 1.25 times a second product of a saturation magnetization of the second magnetic layer and a second magnetic layer thickness of the second magnetic layer along the first direction.

Configuration 17

The magnetic head according to any one of Configurations 1 to 15, wherein
a third magnetic layer thickness along the first direction of the third magnetic layer is not more than 0.7 times a first magnetic layer thickness of the first magnetic layer along the first direction and not more than 0.7 times a second magnetic layer thickness of the second magnetic layer along the first direction.

Configuration 18

The magnetic head according to Configuration 17, wherein
the second magnetic layer thickness is not less than 0.8 times and not more than 1.25 times the first magnetic layer thickness.

Configuration 19

The magnetic head according to any one of Configurations 1 to 17, wherein
the second nonmagnetic layer and the third nonmagnetic layer each include at least one selected from the group consisting of Cu, Au, and Ag.

Configuration 20

A magnetic recording device, comprising:
the magnetic head according to any one of Configurations 1 to 19; and
an electrical circuit,
the electrical circuit being configured to supply a current to the stacked body,
the current having an orientation from the first magnetic layer toward the second magnetic layer.

According to embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, nonmagnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
  a first magnetic pole;
  a second magnetic pole; and
  a stacked body provided between the first magnetic pole and the second magnetic pole, the stacked body including
    a first magnetic layer,
    a second magnetic layer provided between the first magnetic layer and the second magnetic pole,
    a third magnetic layer provided between the second magnetic layer and the second magnetic pole,
    a first nonmagnetic layer provided between the first magnetic layer and the second magnetic layer,
    a second nonmagnetic layer provided between the second magnetic layer and the third magnetic layer, and
    a third nonmagnetic layer provided between the first magnetic pole and the first magnetic layer,
  a first magnetic pole length of the first magnetic pole along a second direction being less than a second magnetic pole length of the second magnetic pole along the second direction,
  the second direction being along a medium-facing surface of the first magnetic pole and being perpendicular to a first direction from the first magnetic layer toward the second magnetic layer,
  a first magnetic layer length of the first magnetic layer along a third direction perpendicular to the first direction being greater than a second magnetic layer length of the second magnetic layer along the third direction
  wherein
  the second nonmagnetic layer and the third nonmagnetic layer each include at least one selected from the group consisting of Cu, Au, and Ag.

2. The head according to claim 1, wherein the third direction crosses the second direction.

3. The head according to claim 2, wherein the first direction is oblique to the medium-facing surface.

4. The head according to claim 1, wherein the third direction is along the second direction.

5. The head according to claim 1, wherein
  the stacked body further includes a fourth nonmagnetic layer provided between the third magnetic layer and the second magnetic pole,
  the first magnetic layer includes at least one of Fe, Co, or Ni,
  the second magnetic layer includes at least one of Fe, Co, or Ni, and
  the third magnetic layer includes at least one of Fe, Co, or Ni.

6. The head according to claim 1, wherein
  the first magnetic layer includes at least one of Fe, Co, or Ni,
  the second magnetic layer includes at least one of Fe, Co, or Ni,
  the third magnetic layer includes:
    a first element including at least one of Fe, Co, or Ni; and
    a second element including at least one selected from the group consisting of Cr, V, Mn, Ti, and Sc, and
  the first magnetic layer and the second magnetic layer do not include the second element, or concentrations of the second element in the first and second magnetic layers are less than a concentration of the second element in the third magnetic layer.

7. The head according to claim 6, wherein the third magnetic layer contacts the second magnetic pole.

8. The head according to claim 1, wherein
  the first nonmagnetic layer includes at least one selected from the group consisting of Ru, Ir, Ta, and W, and
  a thickness of the first nonmagnetic layer along the first direction is not less than 0.2 nm and not more than 3 nm.

9. A magnetic recording device, comprising:
  the magnetic head according to claim 1; and
  an electrical circuit,
  the electrical circuit being configured to supply a current to the stacked body,
  the current having an orientation from the first magnetic layer toward the second magnetic layer.

10. A magnetic head, comprising:
  a first magnetic pole;
  a second magnetic pole; and
  a stacked body provided between the first magnetic pole and the second magnetic pole, the stacked body including
    a first magnetic layer,
    a second magnetic layer provided between the first magnetic layer and the second magnetic pole,
    a third magnetic layer provided between the second magnetic layer and the second magnetic pole, a first nonmagnetic layer provided between the first magnetic layer and the second magnetic layer,
a second nonmagnetic layer provided between the second magnetic layer and the third magnetic layer, and
a third nonmagnetic layer provided between the first magnetic pole and the first magnetic layer,
a first magnetic pole length of the first magnetic pole along a second direction being less than a second magnetic pole length of the second magnetic pole along the second direction,
the second direction being along a medium-facing surface of the first magnetic pole and being perpendicular to a first direction from the first magnetic layer toward the second magnetic layer,
a first magnetic layer length of the first magnetic layer along a third direction perpendicular to the first direction being greater than a second magnetic layer length of the second magnetic layer along the third direction, wherein
a first product of a saturation magnetization of the first magnetic layer and a first magnetic layer thickness of the first magnetic layer along the first direction is not less than 0.8 times and not more than 1.25 times a second product of a saturation magnetization of the second magnetic layer and a second magnetic layer thickness of the second magnetic layer along the first direction.

11. A magnetic head, comprising:
a first magnetic pole;
a second magnetic pole; and
a stacked body provided between the first magnetic pole and the second magnetic pole, the stacked body including
a first magnetic layer,
a second magnetic layer provided between the first magnetic layer and the second magnetic pole,
a third magnetic layer provided between the second magnetic layer and the second magnetic pole,
a first nonmagnetic layer provided between the first magnetic layer and the second magnetic layer,
a second nonmagnetic layer provided between the second magnetic layer and the third magnetic layer, and
a third nonmagnetic layer provided between the first magnetic pole and the first magnetic layer,
a first magnetic pole length of the first magnetic pole along a second direction being less than a second magnetic pole length of the second magnetic pole along the second direction,
the second direction being along a medium-facing surface of the first magnetic pole and being perpendicular to a first direction from the first magnetic layer toward the second magnetic layer,
a first magnetic layer length of the first magnetic layer along a third direction perpendicular to the first direction being greater than a second magnetic layer length of the second magnetic layer along the third direction, wherein
a third magnetic layer thickness along the first direction of the third magnetic layer is not more than 0.7 times a first magnetic layer thickness of the first magnetic layer along the first direction and not more than 0.7 times a second magnetic layer thickness of the second magnetic layer along the first direction.

12. The head according to claim 11, wherein
the second magnetic layer thickness is not less than 0.8 times and not more than 1.25 times the first magnetic layer thickness.

* * * * *